(12) United States Patent
Cho et al.

(10) Patent No.: US 11,452,419 B2
(45) Date of Patent: Sep. 27, 2022

(54) CLEANING DEVICE HAVING VACUUM CLEANER AND DOCKING STATION AND METHOD OF CONTROLLING THE SAME

(71) Applicant: Samsung Electronics Co., Ltd., Suwon-si (KR)

(72) Inventors: Yoonkyung Cho, Suwon-si (KR); Seehyun Kim, Suwon-si (KR); Jongsoon Kim, Suwon-si (KR); Gihyeong Lee, Suwon-si (KR); Seongu Lee, Suwon-si (KR); Ahyoung Lee, Suwon-si (KR); Jaeshik Jeong, Suwon-si (KR); Seungryong Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/315,884

(22) Filed: May 10, 2021

(65) Prior Publication Data

US 2021/0259487 A1 Aug. 26, 2021

Related U.S. Application Data

(63) Continuation of application No. 17/014,384, filed on Sep. 8, 2020.

(30) Foreign Application Priority Data

Sep. 5, 2019 (KR) .......................... 10-2019-0110380
Jun. 10, 2020 (KR) .......................... 10-2020-0070265

(51) Int. Cl.
*A47L 9/14* (2006.01)
*A47L 9/28* (2006.01)

(52) U.S. Cl.
CPC ............. *A47L 9/149* (2013.01); *A47L 9/2842* (2013.01); *A47L 9/2873* (2013.01)

(58) Field of Classification Search
None
See application file for complete search history.

(56) References Cited

U.S. PATENT DOCUMENTS 4,329,161 A * 5/1982 Osborn .................. B01D 46/71
15/352
5,837,207 A 11/1998 Summers
(Continued)

FOREIGN PATENT DOCUMENTS

EP 2 407 074 A2 1/2012
JP 3301452 B2 7/2002
(Continued)

OTHER PUBLICATIONS

Korean Office Action with English translation dated May 13, 2021; Korean Appln. No. 10-2021-0005340.
(Continued)

*Primary Examiner* — Mikhail Kornakov
*Assistant Examiner* — Pradhuman Parihar
(74) *Attorney, Agent, or Firm* — Jefferson IP Law, LLP

(57) ABSTRACT

A cleaning device and a method therefor are provided. The cleaning device includes a vacuum cleaner including a dust collecting container and a docking station to which the dust collecting container is coupled. The docking station includes a suction device configured to move air from the dust collecting container to inside of the docking station, a collector configured to collect a foreign substance that is moved together with the air by driving of the suction device, a suction flow path along which air moves inside the docking station, a flow adjusting device configured to open or close the suction flow path, and at least one processor configured (Continued)

to control the suction device to operate based on the dust collecting container being coupled to the docking station, and control the flow adjusting device to periodically open and close the suction flow path in a state in which the suction device operates.

18 Claims, 27 Drawing Sheets

(56) References Cited

U.S. PATENT DOCUMENTS

| | | | |
|---|---|---|---|
| 2003/0221279 | A1 | 12/2003 | Oh et al. |
| 2012/0246863 | A1 | 10/2012 | Douglas |
| 2013/0117959 | A1 | 5/2013 | Stryker et al. |
| 2013/0144232 | A1 | 6/2013 | Michaels et al. |
| 2016/0051102 | A1 | 2/2016 | Kim |
| 2016/0106284 | A1 | 4/2016 | Mantyla et al. |
| 2016/0183752 | A1* | 6/2016 | Morin ............ A47L 9/1472 134/18 |
| 2018/0177358 | A1 | 6/2018 | Conrad |
| 2019/0200826 | A1* | 7/2019 | Burbank ............ A47L 9/1481 |

FOREIGN PATENT DOCUMENTS

| | | | |
|---|---|---|---|
| JP | 3831675 | B2 | 10/2006 |
| JP | 2009082542 | A | 4/2009 |
| JP | 2014-128393 | A | 7/2014 |
| JP | 2017-189453 | A | 10/2017 |
| KR | 10-1996-0011002 | | 2/1996 |
| KR | 20-0382160 | Y1 | 4/2005 |
| KR | 10-0715774 | B1 | 1/2007 |
| KR | 10-2007-0074146 | A | 7/2007 |
| KR | 10-1010422 | B1 | 1/2010 |
| KR | 10-1496913 | B1 | 5/2012 |
| WO | 2007/137234 | A2 | 11/2007 |
| WO | 2018/235931 | A1 | 12/2018 |

OTHER PUBLICATIONS

Korean Office Action with English translation dated May 13, 2021; Korean Appln. No. 10-2021-0035804.
Korean Office Action dated May 13, 2021; Korean Appln. No. 10-2021-0035828.
U.S. Office Action dated May 11, 2021; U.S. Appl. No. 17/014,384.
U.S. Restriction Requirement dated Jul. 26, 2021; U.S. Appl. No. 17/315,905.
Korean Office Action dated Jul. 16, 2020 of counterpart application No. 10-2020-0070265.
Notice of Allowance issued by Korean Intellectual Property Office in Korean Application No. 10-2020-0070265, dated Oct. 16, 2020.
European Search Report dated Feb. 19, 2021, issued in European Application No. 20194641.5.
International Search Report dated Dec. 4, 2020, in International Application No. PCT/KR2020/011398.
Korean Office Action dated Jun. 10, 2020, in Korean Application No. 10-2020-0070265.
Korean Office Action with English translation dated Aug. 23, 2021; Korean Appln. No. 10-2021-0005340.
Korean Office Action with English translation dated Oct. 15, 2021; Korean Appln. No. 10-2021-0005340.
Korean Office Action with English translation dated Aug. 23, 2021; Korean Appln. No. 10-2021-0035804.
Korean Office Action with English translation dated Aug. 23, 2021; Korean Appln. No. 10-2021-0035828.
U.S. Office Action dated Nov. 22, 2021; U.S. Appl. No. 17/333,593.
Korean Office Action with English translation dated Mar. 29, 2022; Korean Appln. No. 10-2021-0062183.
U.S. Office Action dated Mar. 17, 2022; U.S. Appl. No. 17/333,593.
U.S. Office Action dated Mar. 14, 2022; U.S. Appl. No. 17/014,384.
European Office Action dated May 9, 2022; European Appln. No. 22 152 220.4-1016.
Extended European Search Report dated Aug. 3, 2022; European Appln. No. 22165201.9-1016 / 4049573.

* cited by examiner

CLEANING DEVICE HAVING VACUUM CLEANER AND DOCKING STATION AND METHOD OF CONTROLLING THE SAME

CROSS-REFERENCE TO RELATED APPLICATION(S)

This application is a continuation application of prior application Ser. No. 17/014,384, filed on Sep. 8, 2020, which is based on and claims priority under 35 U.S.C. § 119(a) of a Korean patent application number 10-2019-0110380, filed on Sep. 5, 2019, and of a Korean patent application number 10-2020-0070265, filed on Jun. 10, 2020, in the Korean Intellectual Property Office, the disclosures of each of which is incorporated by reference herein in its entirety.

BACKGROUND

1. Field

The disclosure relates to a cleaning device including a vacuum cleaner and a docking station.

2. Description of the Related Art

In general, a vacuum cleaner is a device that is equipped with a fan motor generating a suction power and configured to suck foreign substance, such as dust, together with air through the suction power generated by the fan motor, separate and collect the suctioned foreign substance from the air so that cleaning is performed.

To this end, the vacuum cleaner includes a dust collecting container for collecting foreign substance, and the user needs to periodically remove the collected foreign substance from the dust collecting container. However, when the user removes the foreign substance from the dust collecting container, the foreign substance may be scattered, which may increase the concentration of dust in the room.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, as aspect of the disclosure is to provide a cleaning device including a docking station that allows foreign substances in a dust collecting container of a vacuum cleaner to be automatically discharged by providing an irregular suction airflow when the dust collecting container is docked.

Additional aspects will be set forth in part in the description which follows and, in part, will be apparent from the description, or may be learned by practice of the presented embodiments.

In accordance with an aspect, a cleaning device is provided. The cleaning device includes a vacuum cleaner including a dust collecting container, and a docking station to which the dust collecting container is coupled, wherein the docking station includes a suction device configured to move air from the dust collecting container to an inside of the docking station, a collector configured to collect a foreign substance that is moved together with the air by driving of the suction device, a suction flow path along which air moves inside the docking station, a flow adjusting device configured to open or close the suction flow path, and at least one processor configured to control the suction device to operate in response to the dust collecting container being coupled to the docking station, and control the flow adjusting device to periodically open and close the suction flow path in a state in which the suction device operates.

The at least one processor may further be configured to control the suction device and the flow adjusting device to stop operating based on a preset operation time elapsing after initiation of the operation of the suction device.

The at least one processor may further be configured to set the preset operation time to be longer based on an external power frequency becoming lower.

The at least one processor may further be configured to set the preset operation time such that the flow adjusting device stops in a state of the suction flow path being open, based on an opening and closing period of the flow adjusting device for the suction flow path.

The at least one processor may further be configured to control the flow adjusting device to close the suction flow path based on a preset waiting time elapsing after the suction device stops operation.

The docking station may further include a position detection sensor configured to output a first value in response to the flow adjusting device closing the suction flow path, and output a second value in response to the flow adjusting device opening the suction flow path, and the at least one processor, as an external power frequency becomes lower, may further be configured to delay a time point at which the suction flow path is determined as being closed after initiation of the output of the first value.

When controlling the suction device to operate, the at least one processor may further be configured to supply a voltage to the suction device and control the flow adjusting device to open the suction flow path while the voltage supplied to the suction device is increasing to a target voltage.

The docking station may further include an inputter configured to receive an input from a user.

The at least one processor, in response to receiving an action command through the inputter in response to the dust collecting container being connected to the docking station, may further be configured to control the suction device and the flow adjusting device to operate for the preset operation time.

The at least one processor, in response to receiving a stop command through the inputter while the suction device and the dust collecting container are operating, may further be configured to control the flow adjusting device to open the suction flow path and control the suction device to stop operation after a predetermined waiting time from the input of the stop command.

The at least one processor, in response to receiving an input of a suction mode through the inputter, may further be configured to control the suction device to operate and control the flow adjusting device to open the suction flow path while the suction device is operating.

The docking station may further include a display part on which an operation state is displayed, and a collector sensor configured to detect whether the collector is in a full state, wherein the at least one processor may further be configured to control the display part to display fullness of the collector in response to the collector being in a full state.

The docking station may further include an ultraviolet lamp configured to irradiate at least one of the dust collecting container or the collector with ultraviolet rays.

In accordance with another aspect of the disclosure, a cleaning device is provided. The cleaning device includes a vacuum cleaner including a dust collecting container, and a docking station to which the dust collecting container is coupled, wherein the docking station includes a suction fan configured to move air from the dust collecting container to an inside of the docking station, a motor configured to rotate the suction fan, and at least one processor configured to adjust at least one of a driving time of the motor or a rotation speed of the motor while repeating on and off operations of the motor.

The at least one processor may further be configured to adjust at least one of a time for which the motor is at an on-state or a time for which the motor is at an off-state whenever the motor is alternately turned on and off.

The at least one processor may further be configured to adjust a pulse width of a supply voltage supplied to the motor whenever the motor is alternately turned on and off, to adjust the rotation speed of the motor.

The at least one processor may further be configured to set different pulse widths for pulses of the supply voltage within at least one time section among time sections in which the motor is turned on or off, so that the motor is vibrated.

The docking station may further include a suction flow path along which the air moves inside the docking station, and a flow adjusting device configured to open or close the suction flow path, wherein the at least one processor is further configured to control the motor to be at an on-state in response to the flow adjusting device opening the suction flow path, and control the motor to be at an off-state in response to the flow adjusting device closing the suction flow path.

In accordance with another aspect of the disclosure, a method of controlling a cleaning device comprising a vacuum cleaner is provided. The method includes a dust collecting container and a docking station to which the dust collecting container is coupled, the method including controlling a suction device, which is configured to move air from the dust collecting container to an inside of the docking station, to operate in response to the dust collecting container being coupled to the docking station, and controlling a flow adjusting device to periodically open and close a suction flow path along which the air moves inside the docking station, in a state in which the suction device operates.

The method may further include controlling the suction device and the flow adjusting device to stop operating based on a preset operation time elapsing after initiation of the operation of the suction device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
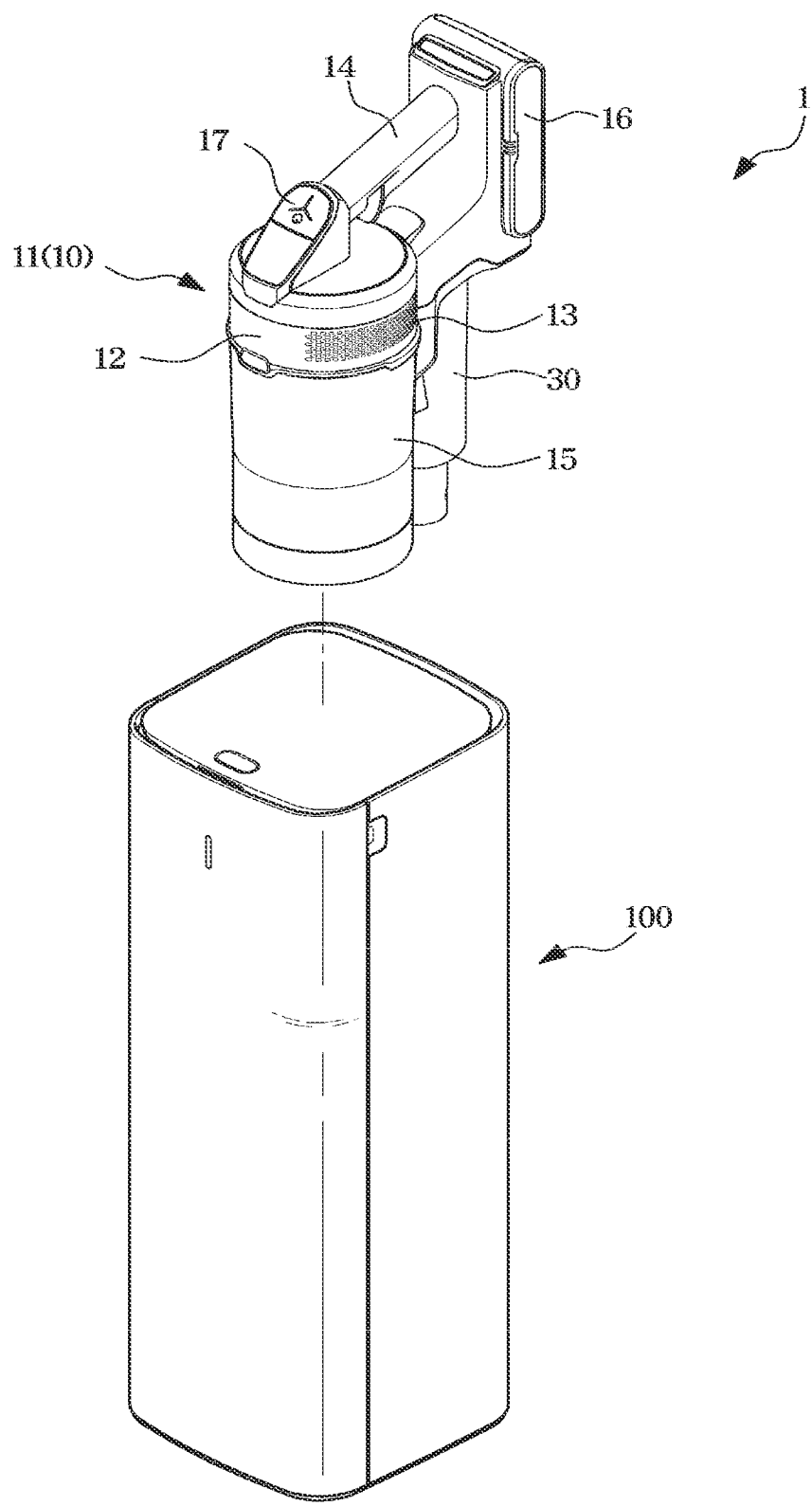
FIG. 1 is an external view illustrating a cleaning device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be further understood that the term "connect" or its derivatives refer both to direct and indirect connection, and the indirect connection includes a connection over a wireless communication network.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, operations, elements, parts, or combinations thereof described in the specification, and do not exclude the presence or addition of one or more other features, numbers, operations, elements, parts, or combinations thereof.

It will be understood that, although the terms first, second, etc. may be used herein to describe various components, these components should not be limited by these terms. These terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware.

Reference numerals used for method operations are just used for convenience of explanation, but not to limit an order of the operations. Thus, unless the context clearly dictates otherwise, the written order may be practiced otherwise.

Hereinafter, various embodiments according to the disclosure will be described in detail with reference to the accompanying drawings.

Figure 2:
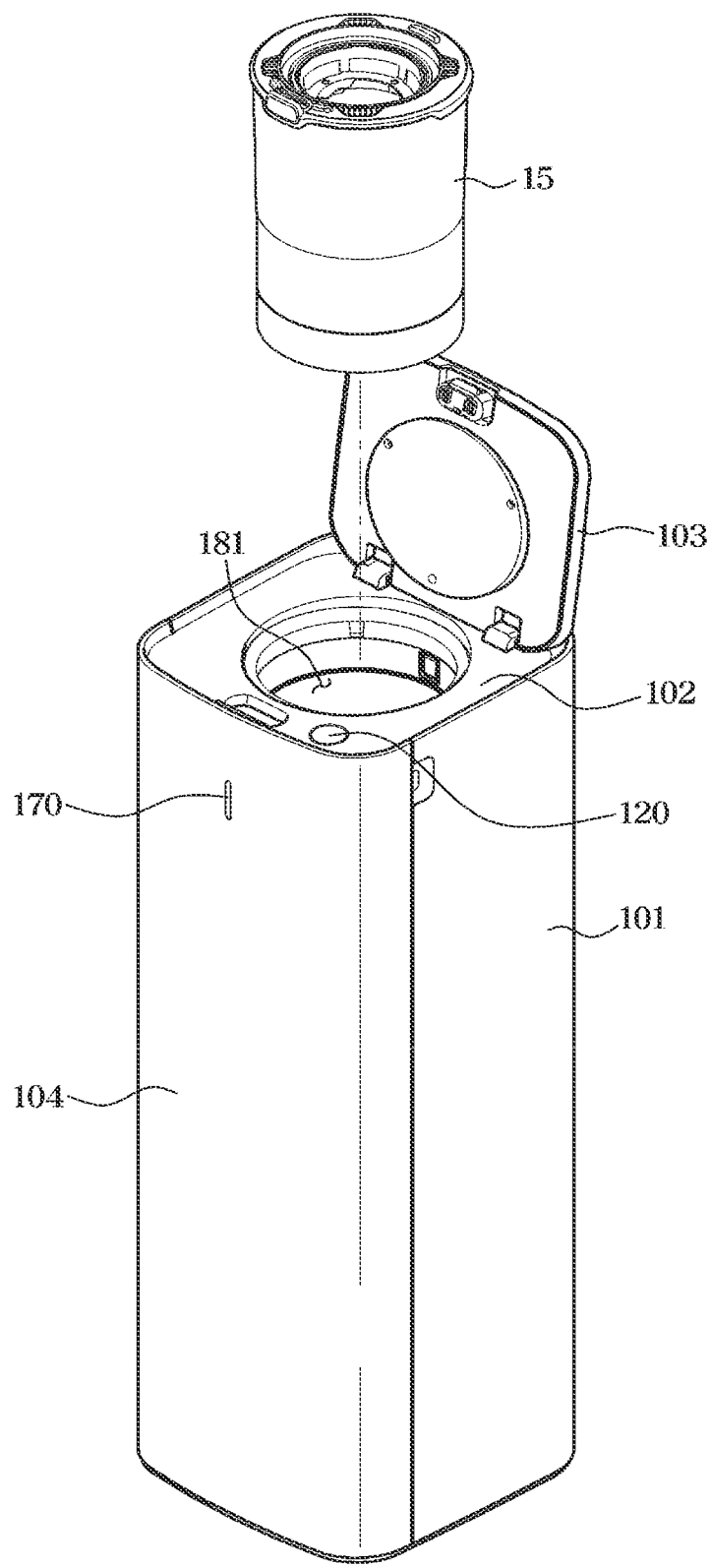
FIG. 2 is a view illustrating a state in which a dust collecting container of a vacuum cleaner is connected to a docking station according to an embodiment of the disclosure.

FIG. 1 is an external view illustrating a cleaning device according to an embodiment of the disclosure, and FIG. 2 is a view illustrating a state in which a dust collecting container of a vacuum cleaner is connected to a docking station according to an embodiment of the disclosure.

Referring to FIG. 1, a cleaning device 1 according to an embodiment may include a vacuum cleaner 10 including a dust collecting container 15 configured to store suctioned foreign substances and a docking station 100 configured to suction the foreign substances stored in the dust collecting container 15 when connected with the dust collecting container 15 to remove the foreign substances from the dust collecting container.

The vacuum cleaner 10 according to the embodiment includes a cleaner main body 11, an extension tube (not shown) detachably coupled to the cleaner main body 11, a suction unit (not shown) detachably coupled to the extension tube (not shown), and a dust collecting container 15 detachably coupled to the cleaner main body 11.

The cleaner main body 11 may include a suction motor (not shown) that generates a suction force required to suction foreign substances on a surface to be cleaned, and the dust collecting container 15 in which foreign substances suctioned from the surface to be cleaned are accommodated.

The dust collecting container 15 is disposed upstream of an airflow relative to the suction motor and configured to filter and collect dust or dirt in the air flowing into the dust collecting container 15 through the suction unit (not shown). The dust collecting container 15 may be detachably provided on the cleaner main body 11.

The vacuum cleaner 10 may include a filter housing 12. The filter housing 12 is provided in a substantially donut shape to accommodate a filter (not shown) therein. The type of filter is not limited, but a high-efficiency particulate air (HEPA) filter, for example, may be disposed inside the filter housing 12. The filter may filter ultrafine dust and the like that are not filtered out of the dust collecting container 15. The filter housing 12 may include an outlet 13 so that air passing through the filter is discharged to the outside of the vacuum cleaner 10.

The cleaner main body 11 may include a handle 14 that may be gripped by the user to manipulate the vacuum cleaner 10. The user may hold the handle 14 and move the vacuum cleaner 10 forward and backward.

The cleaner main body 11 may include a battery 16 providing driving force to the vacuum cleaner 10. The battery 16 may be detachably mounted to the main body 11.

The cleaner main body 11 may include a manipulating part 17. The user may turn on/off the vacuum cleaner 10 or adjust the suction strength by manipulating a power button or the like provided on the manipulating part 17.

The cleaner main body 11 may include a dust collecting guide 30 that guides foreign substance to the dust collecting container 15 by connecting the dust collecting container 15 to the extension tube (not shown) and the suction unit (not shown).

The dust collecting guide 30 may be coupled to the above-described extension tube (not shown) while guiding the foreign substance to the dust collecting container 15 as described above. In addition, the dust collecting guide 30 may be provided to be directly coupled to the suction unit (not shown) in addition to the extension tube (not shown) or to be couplable o other components, such as an auxiliary suction unit.

Accordingly, the user may couple various components to the dust collecting guide 30 according to the cleaning situation, increasing the convenience of cleaning.

Referring to FIG. 2, the docking station 100 according to the embodiment may include a main body 101 and a docking housing 102 formed to allow the dust collecting container 15 of the vacuum cleaner 10 to be docked thereto. The docking housing 102 may include a seating portion 181 on which the dust collecting container 15 is seated.

In addition, the docking station 100 may include a cover 103 disposed above the main body 101 and configured to open and close the docking housing 102.

In addition, the docking station 100 may include an inputter 120 provided on an upper portion thereof to receive an input from a user. The inputter 120, as shown in FIG. 2, may be provided as a button, a switch, and the like. However, the location and type of the inputter 120 are not limited thereto as long as the inputter can receive an input from a user.

In addition, the docking station 100 may include a panel 104 disposed on a front surface of the main body 101 and provided to be detachable from the main body 101. The panel 104 may be disposed on a side surface or a rear surface, as well as the front surface of the main body 101 so as to be detachable from the main body 101.

As the panel 104 is separated from the main body 101, the user may open a collector, which will be described below, and may easily replace a dust bag of the collector.

In addition, the docking station 100 may further include a display part 170 provided on the front surface thereof and displaying an operation state of the docking station 100. For example, as shown in FIG. 2, the display part 170 may correspond to a light emitting diode (LED) panel that emits light. However, the location and type of the display unit 170 are not limited thereto as long as the display part 170 can display an operating state.

In this case, the docking station 100 may be provided to automatically discharge foreign substances in the dust collecting container 15 by varying the suction airflow supplied to the dust collecting container 15 of the vacuum cleaner 10.

Referring to FIGS. 1 and 2, the docking station 100 according to the embodiment may be configured to allow only the dust collecting container 15 to be docked thereto without a configuration to which the dust collecting guide 30 is docked.

That is, in the docking station 100 according to the embodiment, even when only the dust collecting container 15 of the vacuum cleaner 10 is docked to the docking station 100, automatic discharge of the docking station 100 may be efficiently performed.

Therefore, the user may separate only the dust collecting container 15 from the vacuum cleaner 10 and dock the dust collecting container 15 to the docking station 100 rather than docking the vacuum cleaner 10 as a whole to the docking station 100. Accordingly, the size of the docking station 100 may be miniaturized, and dust may be automatically discharged by simply separating the dust collecting container 15.

However, the type of the docking station 100 is not limited to the above example, and according to an embodiment, the docking station 100 may include a component to which the dust collecting guide 30 is docked so that the vacuum cleaner 10 as a whole may be docked to the docking station 100, and may provide a suction airflow to the dust collecting container 15 with the vacuum cleaner 10 as a whole docked.

Hereinafter, an embodiment of the dust collecting container 15 separated and docked to the docking station 100 will be described, but the disclosure is not limited thereto, and the following description may apply to an embodiment of the vacuum cleaner 10 as a whole docked to the docking station 100.

Figure 3:
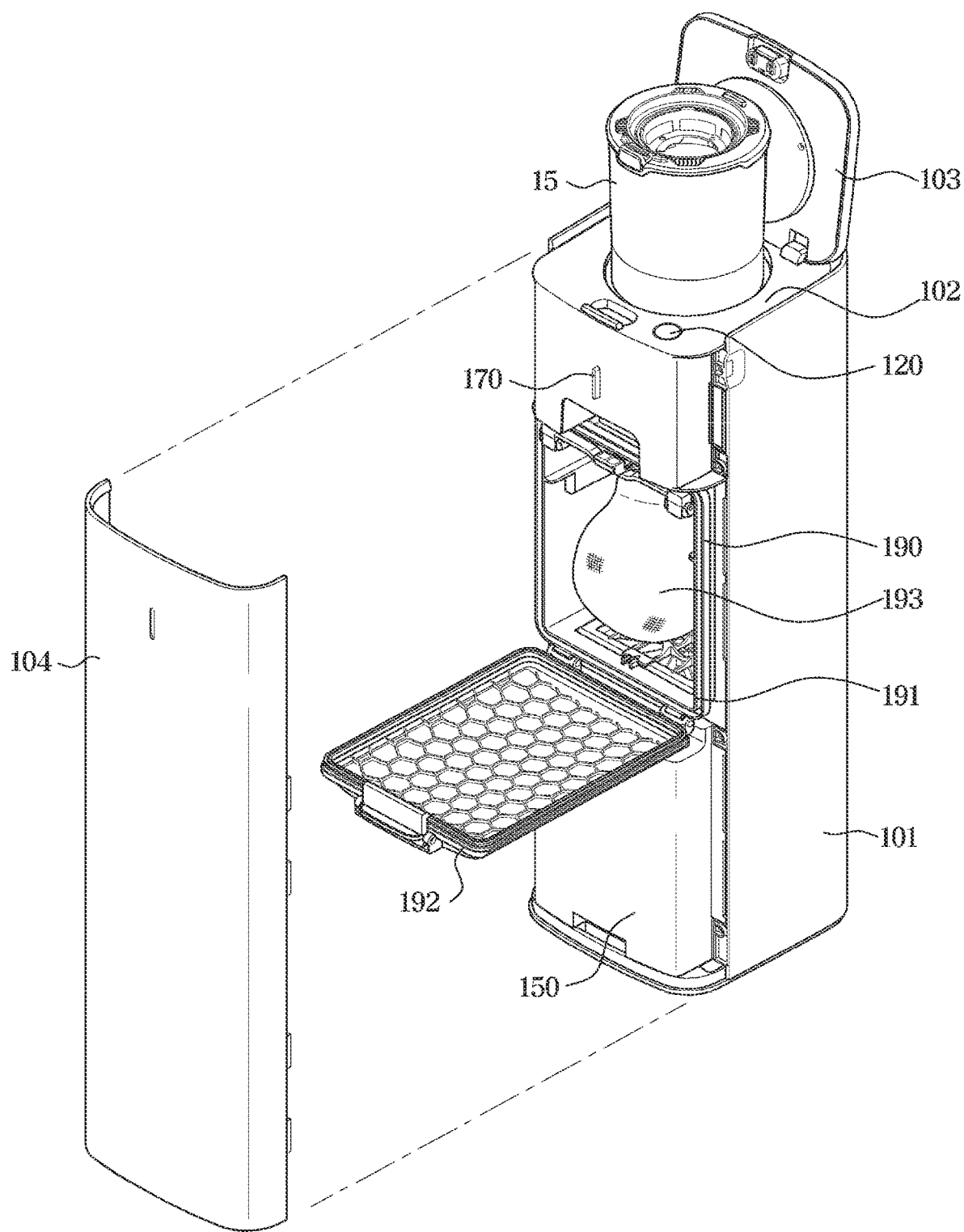
FIG. 3 is an exploded perspective view illustrating a docking station according to an embodiment of the disclosure.
Figure 4:
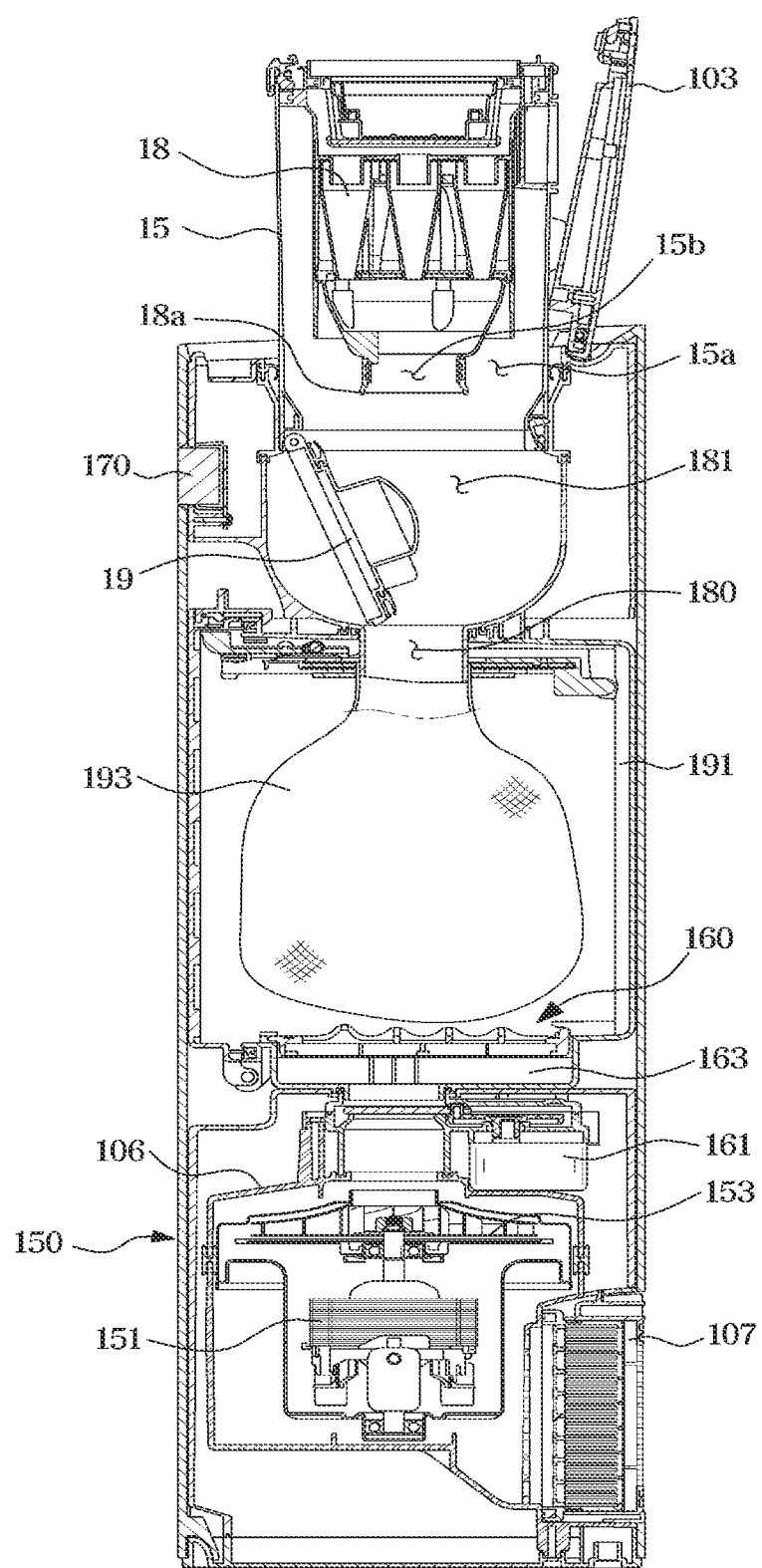
FIG. 4 is a side cross-sectional view illustrating a docking station according to an embodiment of the disclosure.

FIG. 3 is an exploded perspective view illustrating the docking station 100 according to an embodiment of the disclosure, and FIG. 4 is a side cross-sectional view illustrating the docking station 100 according to an embodiment of the disclosure.

Referring to FIGS. 3 and 4, the docking station 100 according to the embodiment may be provided with a suction device 150 and discharge foreign substances collected in the dust collecting container 15 from the dust collecting container 15. The suction device 150 may be disposed inside the main body 101, and includes a suction fan 153 for moving air and a first motor 151 for rotating the suction fan 153.

The docking station 100 according to the embodiment may include the collector 190 in which foreign substances discharged from the dust collecting container 15 are collected. The collector 190 may be disposed inside the main body 101. The collector 190 may be disposed upstream of the airflow relative to the suction device 150.

The docking station 100 according to the embodiment includes a suction flow path 180 including one end connected to the dust collecting container 15 and the other end connected to the suction device 150, and through which air moved by the suction device 150 flows.

In detail, the suction flow path 180 may connect the docking housing 102 to the suction device 150. In this case, the collector 190 may be provided on the suction flow path 180.

That is, the suction flow path 180 connects the docking housing 102 to the collector 190 so that foreign substance discharged from the dust collecting container 15 is suctioned into the collector 190 through the docking housing 102.

The docking housing 102 may include the seating portion 181 that communicates with the suction flow path 180 and on which the dust collecting container 15 is seated.

The seating portion 181 may be a space in the docking housing 102 that is open to the outside such that the dust collecting container 15 is insertedly seated thereon. When the dust collecting container 15 is seated on the seating portion 181, docking of the dust collecting container 15 to the docking station 100 may be completed.

Although not shown in the drawings, a sensor may be provided inside the seating portion 181 to detect whether the dust collecting container 15 is connected. Therefore, when the dust collecting container 15 is seated on the seating portion 181, the docking station 100 may identify the state of the dust collecting container 15 being docked to the docking station 100 through an output value of the sensor 110.

A multi-cyclone 18 may be disposed inside the dust collecting container 15. The dust collecting container 15 may be provided to collect foreign substances in a lower side 18*a* of the multi-cyclone 18. The dust collecting container 15 includes a first dust collector 15*a* that collects relatively large foreign substances that are primarily collected, and a second dust collector 15*b* that collects relatively small foreign substances that are collected by the multi-cyclone 18.

Both the first dust collector 15*a* and the second dust collector 15*b* may be provided to be open to the outside when a dust collecting container door 19 is opened.

Accordingly, when the dust collecting container door 19 disposed under the dust collecting container 15 is opened, foreign substances collected in the dust collecting container 15 may be easily discharged to the seating portion 181.

To this end, the dust collecting container 15 may include the dust collecting container door 19 provided to open the dust collecting container 15 when connected to the docking station 100, and the docking station 100 may include an opening guide configured to press one side of the dust collecting container door 19 to open the dust collecting container door 19 when the dust collecting container 15 is connected to the docking station 100.

The opening guide may be formed as a part of an inner circumferential surface of the seating portion 181. However, the disclosure is not limited thereto, and the opening guide may be provided as one region protruding from the inner circumferential surface of the seating portion 181 to the center side, or may be provided in a shape of a protrusion, a rib, or the like protruding from the inner circumferential surface of the seating portion 181 to the central side. However, the position and type of the opening guide are not limited to the above example, and the opening guide may be implemented in various structures without limitation as long as it can open the dust collecting container door 19 when the dust collecting container 15 is seated.

Therefore, when the dust collecting container 15 is docked to the seating portion 181, a push part is automatically pressed against the opening guide so that the dust collecting container door 19 may be opened at the same time when the dust collecting container 15 is docked to the docking station 100.

The suction flow path 180 may pass through the main body 101 from the docking housing 102 and then be connected to the suction device 150.

The suction flow path 180 may transfer the flow of airflow generated by the suction device 150 to the dust collecting container 15. That is, the suction airflow generated by the suction device 150 is transferred to the inside of the dust collecting container 15 along the collector 190 and the seating portion 181 through the suction flow path 180, and through the suction airflow, foreign substances inside the dust collecting container 15 are discharged from the dust collecting container 15 to the seating portion 181 according to the flow of airflow, and then are collected by the collector 190 through the suction flow path 180.

The collector 190 may include a collector housing 191. The collector housing 191 may form an interior space. That is, the collector housing 191 may correspond to a part of the suction flow path 180, but it will be described as a separate component for the sake of convenience in description.

The collector 190 may include a collector cover 192. The collector cover 192 may be disposed on the front surface of the collector housing 191. The collector cover 192 may open or close the collector housing 191 so that the inside of the collector 190 is open to the outside in a state in which the panel 104 is separated.

The collector 190 may include a dust bag 193 disposed in the interior space of the collector housing 191 and collecting foreign substances flowing through the suction flow path 180.

The dust bag 193 is formed of a material that transmits air while blocking foreign substances, so that foreign substances introduced from the dust collecting container 15 into the collector 190 may be collected therein.

The dust bag 193 may be provided on the suction flow path 441, and the dust bag 193 may be provided separably from the collector 190.

When the docking station 100 is driven and foreign substances are collected in the dust bag 193, the user separates the panel 104 and opens the collector cover 192 to separate the dust bag 193 from the collector 190 such that the foreign substances collected in the docking station 100 are discharged.

The suction device 150 includes the suction fan 153, the first motor 151 for rotating the suction fan 153, and a suction device housing 106 forming the interior space in which the suction fan 153 is disposed.

The suction device housing 106 may include a suction device cover 107 that is disposed on the main body 101 and opens and closes the interior of the suction device 150. The suction device cover 107 may be provided to discharge air suctioned by the suction fan 153.

The suction airflow formed by the suction fan 153 may be supplied to the collector 190 through the suction flow path 180 in the interior space of the suction device housing 106 and then to the dust collecting container 15.

As described above, the suction device 150 may supply the suction airflow to the dust collecting container 15 by rotating the suction fan 153, and air caused to flow by the suction fan 153 may move from the dust collecting container 15 to the collector, finally moving to the outside of the docking station 100.

The docking station 100 may further include a flow adjusting device 160 provided to selectively change the amount of suction airflow supplied to the dust collecting container 15 according to an embodiment. The flow adjusting device 160 may include a flow path valve 163 configured to open or close the suction flow path 180 and a second motor 161 that transmits power to the flow path valve 163.

The flow adjusting device 160 may be disposed inside the main body 101. The flow adjusting device 160 may be disposed between the collector 190 and the suction device 150. In detail, the flow path valve 163 may be disposed in between a connection flow path (the suction flow path) 180 connecting the collector 190 to the suction device 150 and allowing air to flow therein. However, the disclosure is not limited thereto, and the flow path valve 163 may be provided to be disposed in between a connection flow path (the suction flow path) 180 connecting the collector 190 and the seating portion 181.

That is, the flow path valve 163 may open and close the suction flow path 180 based on the power supplied from the second motor 161. To this end, the flow path valve 163 may be provided on the suction flow path 180.

For example, the flow path valve 163 may include a body portion provided in a plate shape and provided to reciprocate in one direction, and may be provided to open and close the suction flow path 180 through the reciprocating movement of the body portion.

In addition, the flow path valve 163 may include a cylindrical form provided to be rotated about a central axis, a body portion providing the cylindrical form, and incision portions formed by cutting both sides of the body portion around the central side, and as the body portion and the incision portions are rotated on the central axis, the suction flow path 180 is opened and closed.

However, the type of the flow path valve 163 is not limited to the above example, and the flow path value 165 may be implemented without limitation as long as it can open and close the suction flow path 180 based on power transmitted from the second motor 161.

In the above, the structural characteristics of the cleaning device 1 have been described in detail. The following description will be made in relation to a control configuration of irregularly supplying a suction airflow to the dust collecting container 15 connected to the docking station 100.

Figure 5:
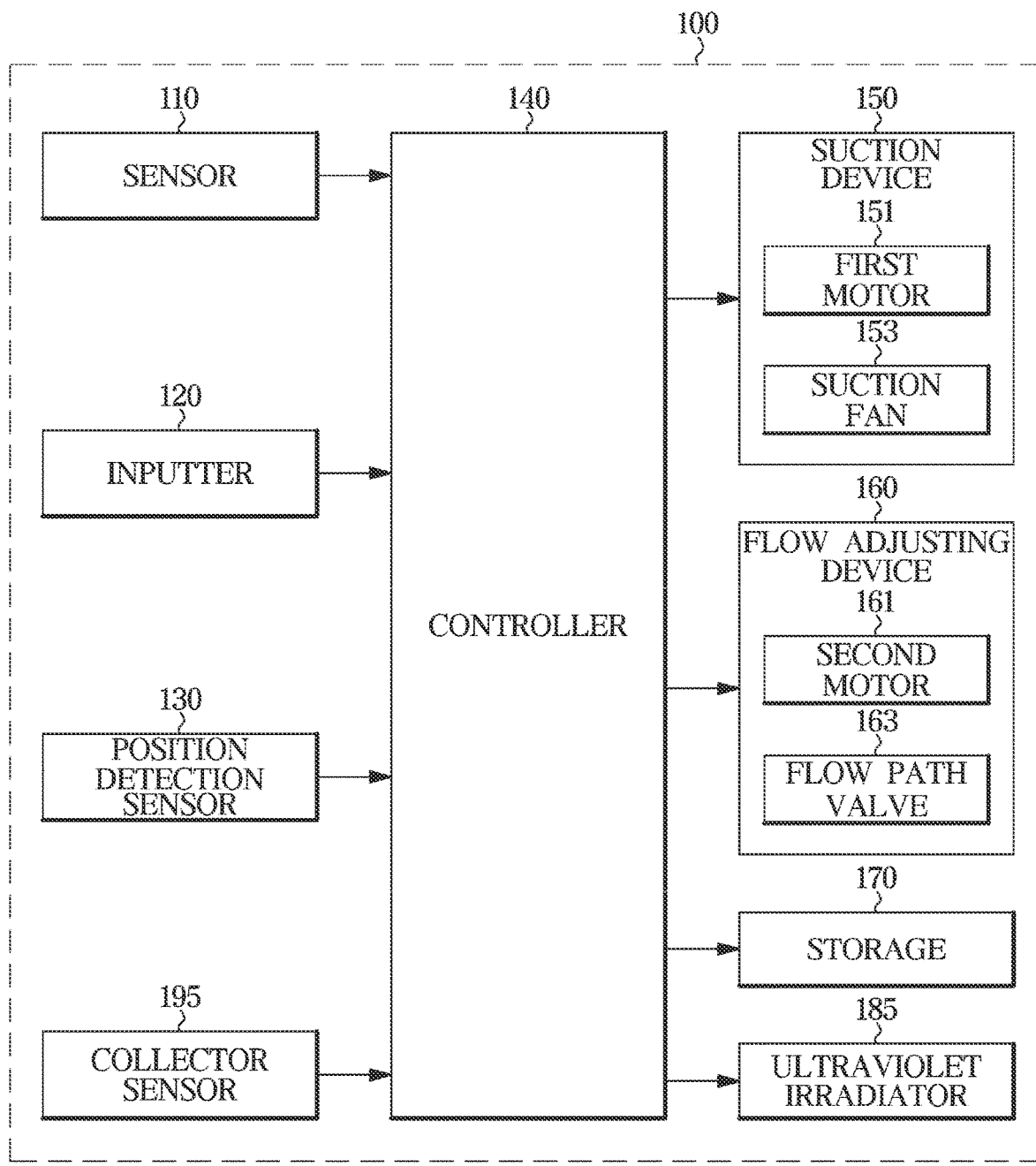
FIG. 5 is a control block diagram illustrating a docking station according to an embodiment of the disclosure.

FIG. 5 is a control block diagram illustrating the docking station 100 according to an embodiment of the disclosure.

Referring to FIG. 5, the docking station 100 according to the embodiment includes the sensor 110 for detecting whether the dust collecting container 15 is connected to the docking state 100, an inputter 120 for receiving an input from a user, a position detection sensor 130 for detecting the position of the flow path valve 163 of the flow adjusting device 160, a collector sensor 195 for detecting whether the collector 190 is in a full state, a controller 140 for controlling the suction device 150 and the flow adjusting device 160 to provide an irregular suction airflow to the dust collecting container 15, the suction device 150 including the first motor 151 and the suction fan 153 and generating a suction airflow that is to be supplied to the dust collecting container 15, the flow adjusting device 160 including the second motor 161 and the flow path valve 163 to open and close the suction flow path 180 and adjusting a flow rate of a suction airflow that is to be supplied to the dust collecting container 15, the display part 170 on which an operation state is displayed, and an ultraviolet irradiator 185 to irradiate the dust collecting container 15 or the collector 190 with ultraviolet rays.

However, some of the components of the docking station 100 shown in FIG. 5 may be omitted according to an embodiment, and the docking station 100 may further include other components in addition to the components shown in FIG. 5 (e.g., a storage in which various pieces of information are stored, such as a flash memory, a random access memory (RAM), and a hard disk drive (HDD)).

The sensor 110 according to the embodiment may detect whether the dust collecting container 15 is connected to the docking station 100.

To this end, the sensor 110 may be provided at one end of the suction flow path 180 to which the dust collecting container 15 is connected, and an output for a case in which the dust collecting container 15 is connected to the docking station 100 may be different from an output for a case in which the dust collecting container 15 is not connected to the docking station 100. In detail, the dust collecting container 15 may be seated at one end of the seating portion 181.

For example, the sensor 110 may be provided as an infrared sensor, a piezoelectric sensor, and the like, but is not limited thereto. The sensor may be variously provided without limitation as long as it can vary output values depending on whether the dust collecting container 15 is connected to the docking station 100.

The inputter 120 according to the embodiment may receive input from a user.

To this end, the inputter 120 may be provided on the main body 101 of the docking station 100, and may be implemented using a physical button, a switch, a knob, a touch pad, and the like.

For example, the input unit 120 may be provided on the upper side of the docking station 100, and may be provided as a button or switch. However, the location and type of the input unit 120 is not limited as long as it can receive user input.

In detail, the inputter 120 may receive, from a user, an action command and a stop command for an operation of removing foreign substances from the dust collecting container 15. In addition, the inputter 120 may receive action commands for various modes, such as a suction mode, a display mode, or the like, according to an embodiment.

The position detection sensor 130 according to the embodiment may detect the position of the flow adjusting device 160.

In detail, the position detection sensor 130 may detect whether the flow path valve 163 of the flow adjusting device 160 is in a position in which the flow path valve 163 closes the suction flow path 180 or in a position in which the flow path valve 163 closes the suction flow path 180.

For example, the position detection sensor 130 may be provided as a micro-switch that is pressurized according to movement of the flow path valve 163 to output a first value when the flow path valve 163 closes the suction flow path 180 and output a second value when the flow path valve 163 opens the suction flow path 180.

However, the position detection sensor 130 is not limited to the above example, and the position detection sensor 130 may be provided as a motor position sensor configured to measure the position of the second motor 161 that transmits power to the flow path valve 163 to output a first value when the flow path valve 163 closes the suction flow path 180 and output a second value when the flow path valve 163 to opens the suction flow path 180. In this case, the position detection sensor 130 may detect the position of a rotor included in the second motor 161, and to this end, may be provided on a surface facing a rotation shaft of the second motor 161. For example, the position detection sensor 130 may correspond to a hall sensor using a hall effect, but is not limited thereto, and the position detection sensor 130 may be variously provided without limitation as long as it can vary an output signal according to the rotation of the motor.

The controller 140 according to the embodiment may control the suction device 150 so that foreign substances in the dust collecting container 15 are discharged into the docking station 100 when the dust collecting container 15 is connected to the docking station 100.

In detail, the controller 140 may determine whether the dust collecting container 15 is connected to the docking station 100 based on the output value of the sensor 110, and when the dust collecting container 15 is connected to the docking station 100, may control an operation initiation of the first motor 151.

However, the controller 140 may further consider an action command of a user entered through the inputter 120 in addition to the output value of the sensor 110, to control the operation initiation only in the presence of the action command from the user.

In this case, when the first motor 151 is kept on and the same suction airflow is supplied to the dust collecting container 15, some of the foreign substances may be caught with internal components of the dust collecting container 15 and may not be discharged to the outside. For example, foreign substances, such as hair, may be caught with the internal structure of the dust collecting container 15, and despite the suction airflow, may remain inside the dust collecting container 15 without being separated to the outside of the dust collecting container 15. That is, the suction airflow delivered to the inside of the dust collecting container 15 may be formed only in the same direction. Accordingly, some foreign substances may have a resistance to the direction in which the suction airflow is formed, and thus may not be separated to the outside of the dust collecting container 15 by the suction airflow. As such, foreign substances inside the dust collecting container 15 may not be effectively discharged.

The docking station 100 according to the embodiment, while a suction airflow is being supplied to the dust collecting container 15 by the suction fan 153 and air in the dust collecting container 15 is suctioned, allows the suction airflow to be changed to thereby change the flow rate of air inside the dust collecting container 15 and diversify the flow of air inside the dust collecting container 15.

The controller 140, in order to provide an irregular suction airflow to the dust collecting container 15, may control the flow adjusting device 160 to periodically open and close the suction flow path 180 during the operation of the suction device 150 (i.e., when the first motor 151 is kept on).

In this case, the controller 140 may continuously supply a voltage to the first motor 151 such that the suction device 150 operates, and during the operation of the suction device 150, the controller 140 may continuously supply a voltage even to the second motor 161 of the flow adjusting device 160.

With such a configuration, the suction device 150 may continuously generate a suction airflow through the suction fan 153, and the flow adjusting device 160 may periodically open and close the suction flow path 180 so that the flow rate of the suction airflow formed by the suction device 150 is periodically changed.

As the direction of the airflow instantaneously changes, some foreign substance having a resistance to a specific direction may lose the resistance due to air flowing in the other direction and thus may escape outside of the dust collecting container 15 together with the airflow.

In this case, the foreign substances separated and discharged from the dust collecting container 15 may be moved together with air by the driving of the suction fan 153 and then collected by the collector 190 provided in the suction flow path 180.

That is, the controller 140 may allow the flow adjusting device 160 to periodically open and close the suction flow path 180 so that the flow of air inside the dust collecting container 15 is changed. With such a configuration, foreign substances in the dust collecting container 15 may be more efficiently discharged.

An embodiment in which the suction flow path 180 is periodically opened and closed by the flow adjusting device 160 during the continuous operation of the suction device 150 (the first motor 151) to remove foreign substances from the dust collecting container 15 will be described below in detail.

In addition, the controller 140 according to the embodiment, in order to supply the dust collecting container 15 with the irregular suction airflow, may adjust at least one of the driving time or the rotating speed of the first motor 151 while repeating on/off the first motor 151 of the suction device 150.

That is, the controller 140 may control the first motor 151 such that the first motor 151 is repeatedly turned on and off.

In this case, the controller 140 adjusts at least one of the time for which the first motor 151 is turned on or the time for which the motor 150 is turned off whenever the first motor 151 is alternately turned on and off, to thereby adjust the driving time of the first motor 151.

In addition, the controller 140 may adjust the pulse width of the supply voltage supplied to the first motor 151 whenever the first motor 151 is alternately turned on and off, to thereby adjust the rotation speed of the first motor 151.

In this case, the suction fan 153 may provide a suction airflow having a different suction power whenever the first motor 151 is alternately turned on and off, according to the change in driving time of the first motor 151 or rotating speed of the first motor 151, and as the internal pressure of the dust collecting container 15 changes due to the irregular suction airflow, foreign substances in the dust collecting container 15 may be smoothly discharged from the dust collecting container 15.

That is, as the flow rate of air inside the dust collecting container 15 changes, air spreads in all directions in the space inside the dust collecting container 15, and accordingly, the airflow inside the dust collecting container 15 may change in various directions.

As the direction of the airflow changes instantaneously, some foreign substance having had a resistance to a specific direction may lose the resistance due to air flowing in another direction and may escape outside of the dust collecting container 15 along with the airflow.

In this case, the foreign substances separated from the dust collecting container 15 and discharged may be moved together with air by the driving of the suction fan 153 and collected in the collector 190 provided in the suction flow path 180.

That is, the controller 140 may repeat the supply and stop of the suction airflow toward the dust collecting container 15 through the on-off control of the first motor 151, and changes the supply time or suction power during the supply of the suction airflow, thereby periodically changing the flow of air inside the dust collecting container 15. With such a configuration, foreign substances in the dust collecting container 15 may be discharged more efficiently.

In addition, the controller 140 according to the embodiment may set different pulse widths for the pulses of the supply voltage within at least one of the time sections in which the first motor 151 is turned on and off, so that the first motor 151 vibrates.

That is, the controller 140 sets the pulse widths of pulses of the supply voltage to be different from each other within an on-time in which the first motor 151 is turned on by being supplied with the voltage, and provides the first motor 151 with the set pulse widths.

For example, the controller 140 may adjust the pulse widths of the supply voltage such that a first pulse width and a second pulse width are alternately provided as the pulses of the supply voltage propagate in at least one time section.

In this case, the first motor 151 may be subject to rapid change of the rotation speed based on the pulse width difference between the pulses of the supply voltage, and accordingly, the first motor 151 may vibrate.

The vibration of the first motor 151 may be transmitted to the main body of the docking station 100 and the dust collecting container 15 connected to the docking station 100. That is, the dust collecting container 15 may vibrate according to the vibration of the first motor 151, and foreign substances in the dust collecting container 15 may be discharged more efficiently according to the vibration. For example, even foreign substances not discharged from the dust collecting container 15 in spite of the suction airflow as being caught in the internal components of the dust collecting container 15 may be discharged from the dust collecting container 15 according to the vibration of the dust collecting container 15 along with the suction airflow.

The controller 140 according to the embodiment may repeat the on/off control of the first motor 151 when the dust collecting container 15 is separated from the docking station 100 or a stop command is input, or until the first motor 151 completes a predetermined number of on-operations (i.e., a preset operation time duration).

The controller 140, when the dust collecting container 15 is connected to the docking station 100 and then is separated from the docking station 100, may drive the first motor 151 for a preset time that is set in advance for foreign substances remaining in the suction flow path 180 to be collected by the collector 190.

The controller 140 according to the embodiment may control the flow path valve 165 in addition to the control of the first motor 151, so as to periodically open and close the suction flow path 180 while the suction airflow by the suction fan 153 is being supplied according to the driving of the first motor 151.

That is, the controller 140 controls the second motor 161 so that the flow path valve 163 periodically opens and closes the suction flow path 180, to repeat supply and stop of the suction airflow toward the dust collecting container 15, so that the flow of air inside the dust collecting container 15 is periodically changed. In other words, the flow path valve 163 may adjust the flow rate of air moved by the suction fan 153, and completely stop the suction airflow that may remain during an off-time in which the voltage is not supplied to the first motor 151, thereby more effectively changing the flow of air inside the dust collecting container 15.

In this case, the controller 140 may determine whether the suction flow path 180 is open or closed by the flow path valve 163 based on the output value of the position detection sensor 130, and drive the first motor 151 based on the opening or closing of the suction flow path 180, so that noise and overload of the first motor 151 may be improved.

In detail, the controller 140 controls the first motor 151 to be turned on when the flow path valve 163 opens the suction flow path 180, and controls the first motor 151 to be turned off when the flow path valve 163 closes the suction flow path 180.

That is, the controller 140 controls the first motor 151 and the second motor 161 in conjunction with each other, thereby performing the supply and repetition of the suction airflow more efficiently, and preventing the suction fan 153 from causing noise due to being rotated when the suction flow path 180 is closed while improving overload of the first motor 151.

The controller 140 may control the second motor 161 such that the flow path valve 163 opens and closes the suction flow path 180 at a preset cycle, or may control the second motor 161 to operate in response to the driving time of the first motor 151 that is changed whenever the first motor 151 is alternately turned on and off.

That is, when the on-time in which the voltage is supplied to the first motor 151 or the off-time in which the voltage is not supplied to the first motor 151 is changed, the controller 140 may control the second motor 161 to operate the flow path valve 163 in response to the changed on-time or off-time.

The controller 140 according to the embodiment may control the flow path valve 163 to close the suction flow path 180 when the dust collecting container 15 is separated from the docking station 100. That is, the controller 140 may control the second motor 161 such that the flow path valve 163 closes the suction flow path 180.

In this case, the closing of the suction flow path 180 according to an embodiment may be performed after the first motor 150 is driven for a preset time which is set such that foreign substances remaining in the suction flow path 180 are collected by the collector 190.

An embodiment in which the suction device 150 (the first motor 151) repeats on and off operations to remove foreign substances from the dust collecting container 15 will be described below in detail.

The controller 140 according to the embodiment, in response to receiving an action command for a suction mode through the inputter 120, may control the suction device 150 to operate by continuously supplying the voltage to the suction device 150 and control the flow adjusting device 160 to open the suction flow path 180 such that the suction fan 153 is continuously rotated without the suction flow path 180 being closed.

The controller 140 according to the embodiment may determine whether the collector 190 is in a full state on the basis of an output of the collector sensor 195, and when the collector 190 is in a full state, the controller 140 may control the display part 170 to display fullness of the collector 190.

The controller 140 according to the embodiment may control the ultraviolet irradiator 185 to irradiate the dust collecting container 15 or the collector 190 with ultraviolet rays.

In detail, the controller 140 may control the ultraviolet irradiator 185 for ultraviolet irradiation when the suction device 150 operates to remove foreign substances from the dust collecting container 15, and may control the ultraviolet irradiator 185 for ultraviolet irradiation on the basis of a user input inputted through the inputter 120.

The controller 140 according to the embodiment, in response to receiving a user input for a display mode through the inputter 120, may control the display part 170 to emit light.

The controller 140 may include at least one memory in which a program for performing the above-described operations and operations described below is stored, and at least one processor for executing the stored program. When the memory and the processor are provided in plural, the plurality of memories and the plurality of processors may be integrated into one chip, or may be provided in physically separate locations.

The suction device 150 according to the embodiment may supply a suction airflow to the dust collecting container 15, and to this end, may include the suction fan 153 and the first motor 151 for transmitting power to the suction fan 153.

The first motor 151 rotates according to the supply voltage to transmit the rotational force to the suction fan 153.

The suction fan 153 rotates based on the power supplied from the first motor 151 to move air from the dust collecting container 15 into the docking station 100.

To this end, the suction fan 155 may be provided at the other end of the suction flow path 180 whose one end is connected to the dust collecting container 15, and may be mechanically connected to the first motor 151 to receive power from the first motor 151.

The flow adjusting device 160 according to the embodiment may open and close the suction flow path 180 at a predetermined cycle when supplied with a voltage. To this end, the flow adjusting device 160 includes the flow path valve 163 capable of opening and closing the suction flow path 180 and the second motor 161 that transmits power to the flow path valve 163.

The second motor 161 may transmit power to the flow path valve 163 to open and close the suction flow path 180.

In detail, the second motor 161, under the control of the controller 140, may transmit power to the flow path valve 163 at a preset cycle or may transmit power to the flow path valve 163 to correspond to the driving time of the first motor 151 that is changed whenever the first motor 151 is alternately turned on and off.

The flow path valve 163 according to the embodiment may open and close the suction flow path 180 based on the power supplied from the second motor 161. To this end, the flow path valve 163 may be provided on the suction flow path 180.

For example, the flow path valve 163 may include a body portion provided in a plate shape and provided to be reciprocated in one direction, and may open and close the suction flow path 180 through the reciprocating motion of the body portion.

In addition, the flow path valve 163 may include a cylindrical form provided to be rotated about a central axis, a body portion providing the cylindrical form, and incision portions formed by cutting both sides of the body portion with respect to the central axis, and the flow path valve 163 may be provided to open and close the suction flow path 180 as the body portion and the incision portions rotate with respect to the central axis.

However, the type of the flow path valve 163 is not limited to the above example, and the flow path value 163 may be implemented without limitation as long as it can open and close the suction flow path 180 based on the power transmitted from the second motor 161.

The display part 170 according to the embodiment may display an operation state of the docking station 100.

For example, the display part 170 may correspond to a light emitting diode (LED) panel for emitting light, and may include a front display provided at the front surface of the docking station 100 to emit light outside of the docking station 100 and an internal display provided on the seating portion 181 to emit light to the dust collecting container 15 from the inside of the seating portion 181.

The display part 170 may correspond to an LED panel provided on the seating portion 181 and emit light to the dust collecting container 15 from inside the seating portion 181.

However, the position and type of the display part 170 are not limited thereto as long as the display part 170 can display an operating state.

The ultraviolet irradiator 185 according to the embodiment may irradiate the dust collecting container 15 or the collector 190 with ultraviolet rays.

To this end, the ultraviolet irradiator 185 may be provided as an ultraviolet lamp provided on the seating portion 181 and emitting ultraviolet rays. In this case, ultraviolet rays emitted from the ultraviolet irradiator 185 may be irradiated to the dust collecting container 15 connected to the docking station 100, and irradiated to the collector 190 through the suction flow path 180.

In addition, the ultraviolet irradiator 185 according to an embodiment may include a motor, and may irradiate the dust collecting container 15 or the collector 190 with ultraviolet rays by mechanically adjusting the irradiation angle based on the rotational force of the motor.

In addition, the ultraviolet irradiator 185 according to an embodiment may include a plurality of ultraviolet lamps and may irradiate the dust collecting container 15 or the collector 190 with ultraviolet rays by adjusting the irradiation intensity of each of the plurality of ultraviolet lamps in an array to electronically adjust the irradiation angle.

In addition, the ultraviolet irradiator 185 according to an embodiment may include an ultraviolet lamp provided on the seating portion 181 to irradiate the dust collecting container 15 with ultraviolet rays and an ultraviolet lamp provided on the collector housing 191 to irradiate the collector 190 with ultraviolet rays.

The collector sensor 195 according to the embodiment may detect whether the collector 190 is in a full state.

For example, the collector sensor 195 may be provided as a pressure sensor, and when the collector 190 is in a full state and interferes with the suction airflow of the suction device 150, the collector sensor 195 may detect a pressure different from that in a normal operation. With such a configuration, the controller 140 may determine that the collector 190 is in a full state when the collector sensor 195 outputs a pressure different from that in a normal operation.

However, the collector sensor 195 is not limited to the above example, and may be various provided as long as it can detect fullness of the collector 190, for example, an optical sensor or a camera.

In the above, components of the docking station 100 have been described in detail. The following description will be made in relation to supplying an irregular suction airflow to the dust collecting container 15 such that foreign substances in the dust collecting container 15 are efficiently discharged.

First, an embodiment in which, in order to supply an irregular suction airflow to the dust collecting container 15, the suction device 150 is controlled to continuously operate, and the flow adjusting device 160 is controlled to periodically to open and close the suction flow path 180 will be described in detail.

Figure 6:
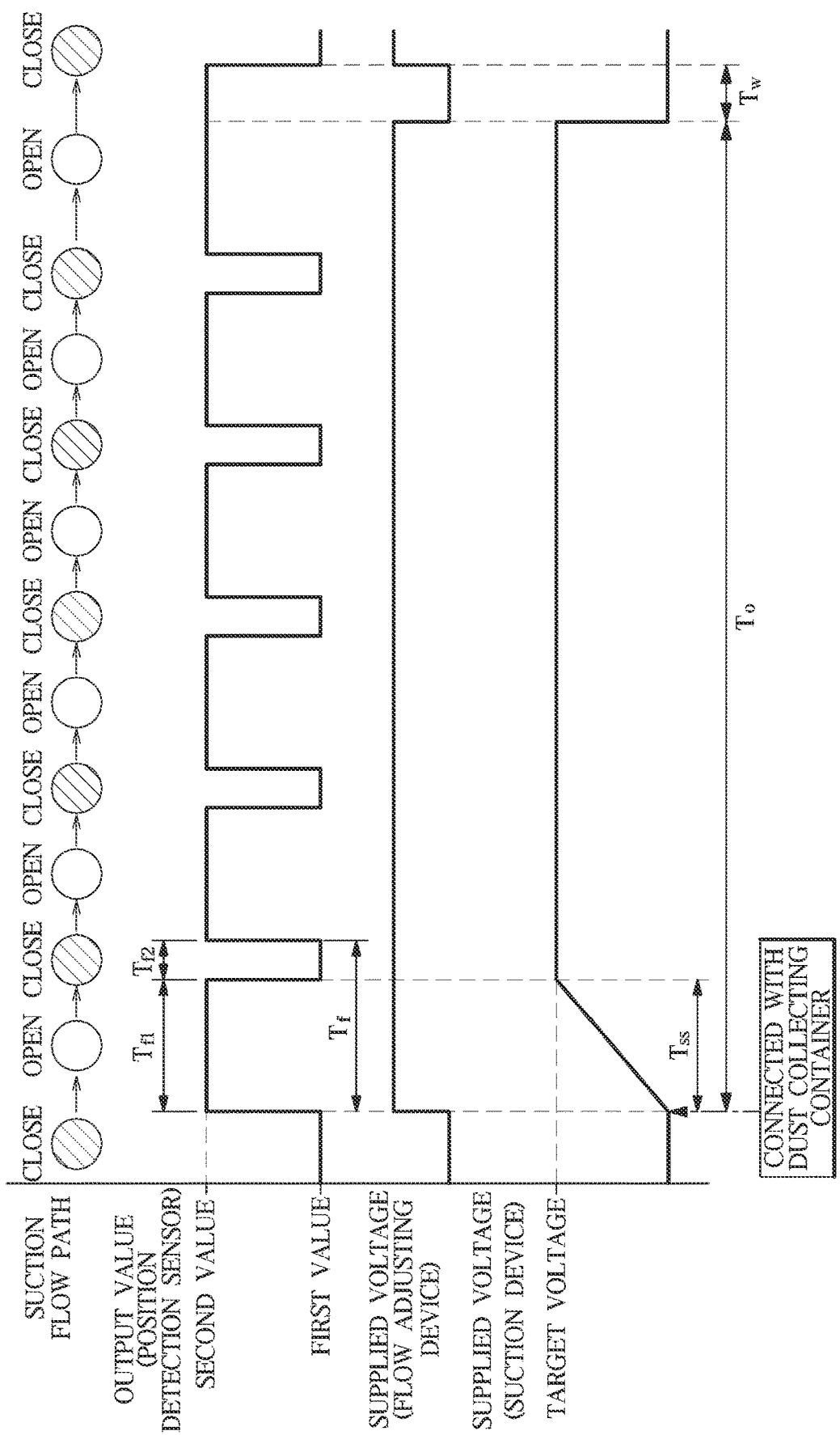
FIG. 6 is a view illustrating a case in which a docking station automatically operates when connected with a dust collecting container according to an embodiment of the disclosure.
Figure 7:
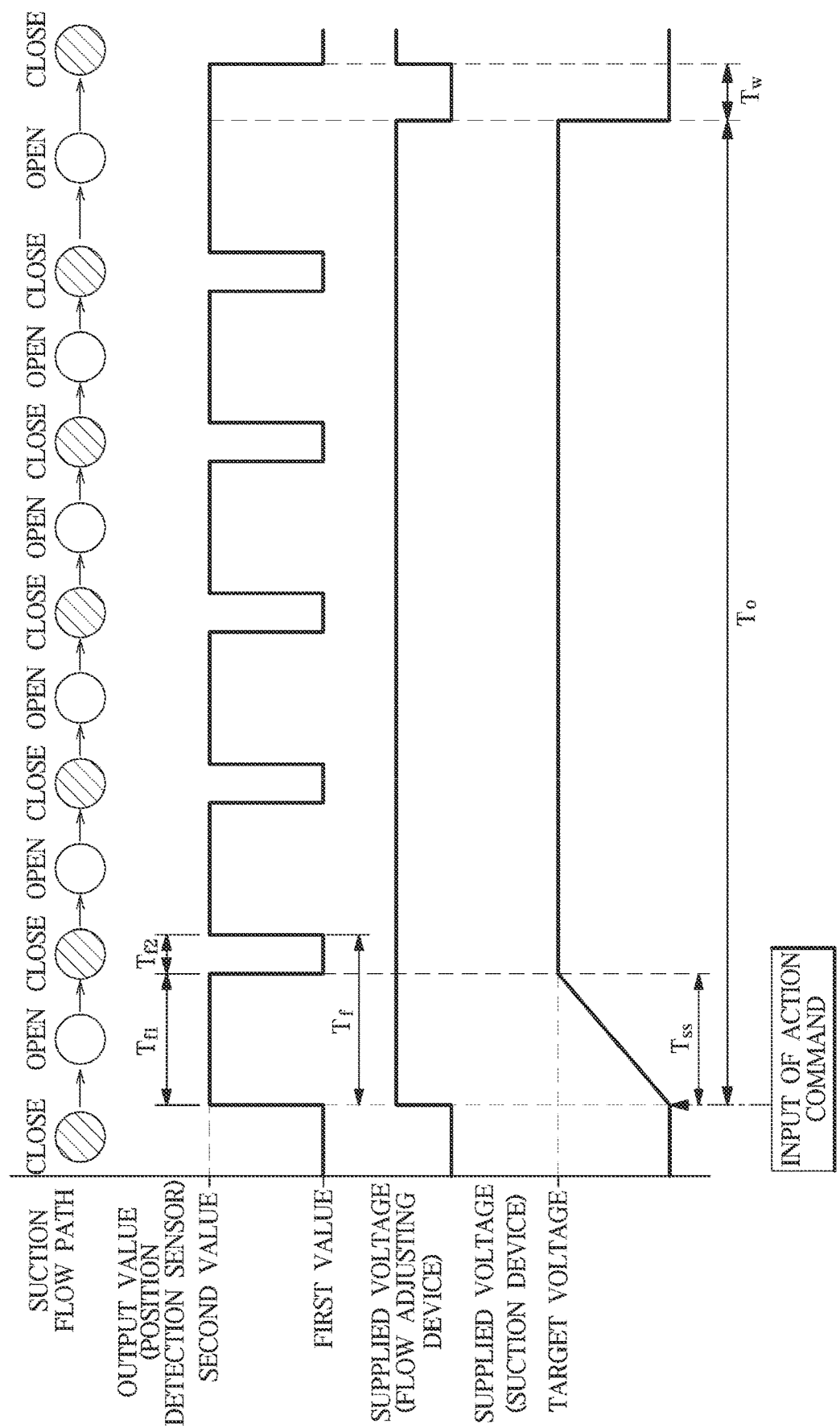
FIG. 7 is a view illustrating a case in which a docking station operates in response to input of an action command according to an embodiment of the disclosure.
Figure 8:
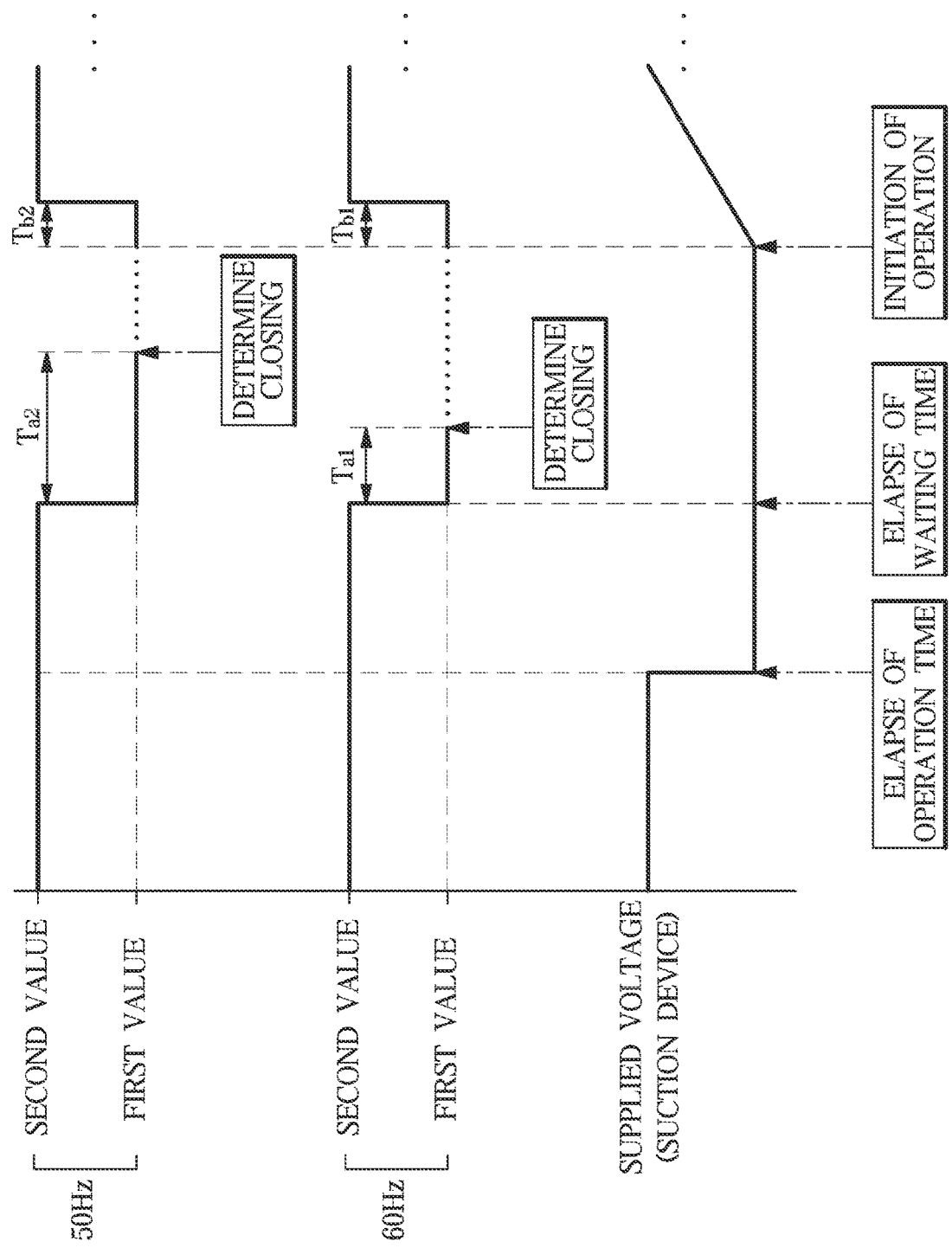
FIG. 8 is a view for describing a time point when a docking station determines closing of a suction flow path in association with an external power frequency according to an embodiment of the disclosure.
Figure 9:
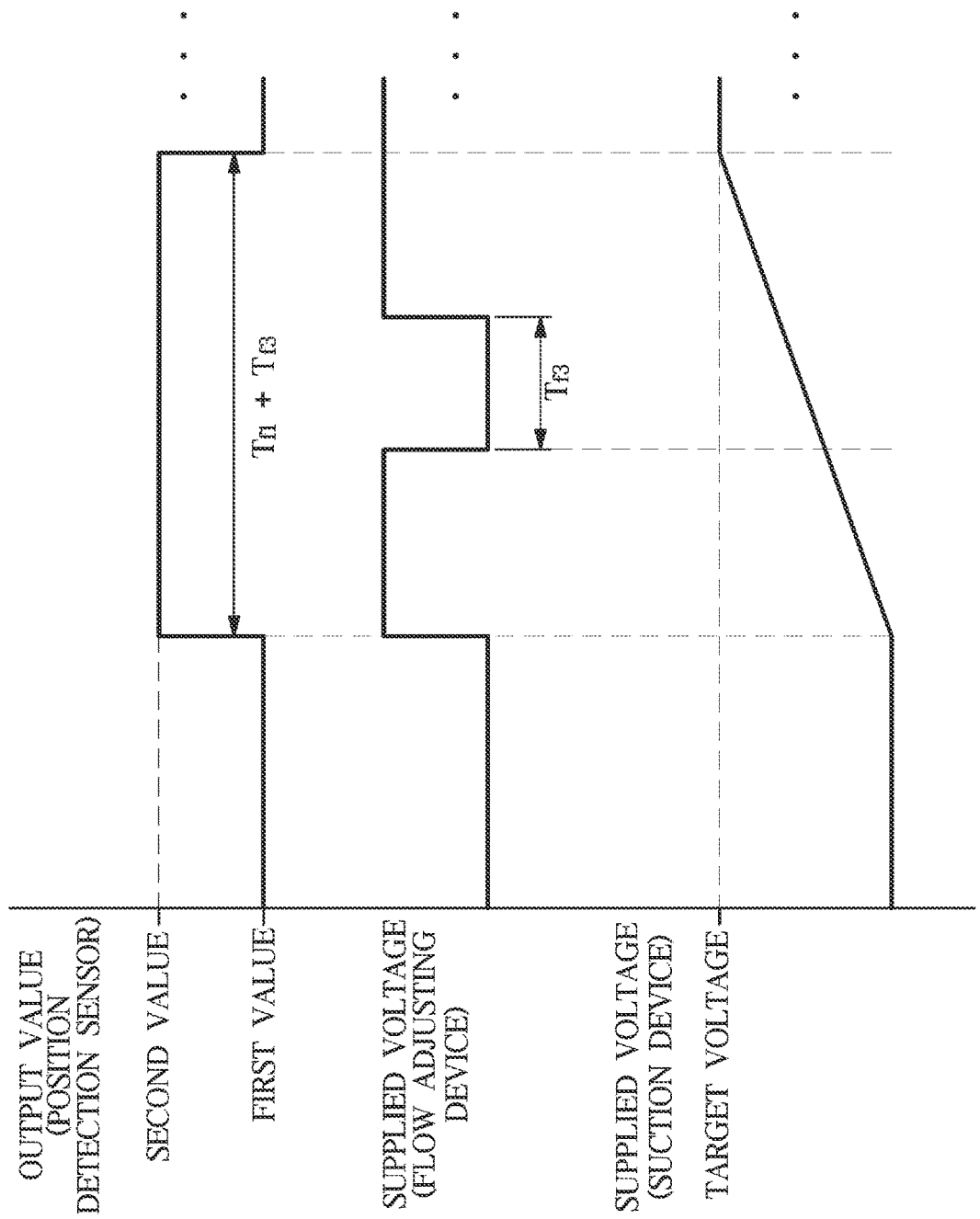
FIG. 9 is a view for describing a case in which a docking station starts operation according to an embodiment of the disclosure.

FIG. 6 is a view illustrating a case in which the docking station 100 automatically operates when connected with the dust collecting container 15 according to an embodiment of the disclosure, FIG. 7 is a view illustrating a case in which the docking station 100 operates in response to input of an action command according to an embodiment of the disclosure, FIG. 8 is a view for describing a time point when the docking station 100 determines closing of the suction flow path 180 in association with an external power frequency according to an embodiment of the disclosure, and FIG. 9 is a view for describing a case in which the docking station 100 initiates operation according to an embodiment of the disclosure.

Referring to FIG. 6, the controller 140 according to the embodiment may be configured to, when connected with the dust collecting container 15, may initiate an operation for removing foreign substances from the dust collecting container 15 by supplying voltage to the suction device 150 and the flow adjusting device 160 without receiving a separate user input.

In detail, the controller 140, in response to determining that the dust collecting container 15 is docked to the seating portion 181 of the docking station 100 based on the output of the sensor 110, may control the suction device 150 and the flow adjusting device 160 to be supplied with voltage to initiate the operation for removing foreign substances from the dust collecting container 15.

In addition, referring to FIG. 7, the controller 140 according to the embodiment may be configured to, when receiving an action command from a user through the inputter 120 in a state of being connected with the dust collecting container 15, initiate an operation for removing foreign substances from the dust collecting container 15 by supplying voltage to the suction device 150 and the flow adjusting device 160.

For example, the user may input an action command by pressing a button corresponding to the inputter 120.

Regardless of whether the operation is initiated by the connection of the dust collecting container 15 or by the input of the action command from the user, details of the operation for removing foreign substance from the dust collecting container 15 are the same, and hereinafter, the operation for removing foreign substances from the dust collecting container 15 will be described with reference to FIGS. 6 and 7.

The controller 140, when the initiation of the operation is determined based on the connection of the dust collecting container 15 or the user input of the action command, may control the suction device 150 to operate for dust removal. That is, the controller 140 may supply a voltage to the suction device 150 to drive the suction fan 153 to form a suction airflow.

In addition, the controller 140 may control the flow adjusting device 160 to periodically open and close the suction flow path 180 while the suction device 150 is operating. That is, the controller 140 may supply a voltage to the flow adjusting device 160 to open and close the suction flow path 180 at a preset cycle.

With such a configuration, the suction device 150 may continuously generate the suction airflow through the suction fan 153, and the flow adjusting device 160 may periodically open and close the suction flow path 180 to periodically change the flow rate of the suction airflow generated by the suction device 150.

As the direction of the airflow changes instantaneously, some foreign substance having had a resistance to a specific direction may lose the resistance due to air flowing in another direction and may escape outside of the dust collecting container 15 along with the airflow.

In this case, the foreign substances separated from the dust collecting container 15 and discharged may be moved together with air by the driving of the suction fan 155 and collected in the collector 190 provided in the suction flow path 180.

That is, the controller 140 may change the flow of air inside the dust collecting container 15 by allowing the flow adjusting device 160 to periodically open or close the suction flow path 180. With such a configuration, foreign substances in the dust collecting container 15 may be discharged more efficiently.

The controller 140 according to the embodiment may control the suction device 150 and the flow adjusting device 160 to stop the dust discharge operation when a preset operation time $T_O$ has elapsed after initiation of the operation of the suction device 150.

That is, the controller 140 may control the suction device 150 and the flow adjusting device 160 to operate during a preset operation time $T_O$ for discharging foreign substances from the dust collecting container 15, and when the preset operation time $T_O$ has elapsed after the initiation of the operation, may stop supplying the voltages to the suction device 150 and the flow adjusting device 160.

In this case, the flow adjusting device 160 may repeat the opening and closing of the suction flow path 180 by a preset number of times (e.g., five times) during the preset operation time $T_O$. That is, the preset operation time $T_O$ may be a time set to repeat the opening and closing of the suction flow path 180 by a preset number of times (e.g., five times) in consideration of the opening and closing period of the flow adjusting device 160.

In this case, the controller 140 may set the operation time $T_O$ to be longer as the external power frequency becomes lower. As the external power frequency become lower, the number of rotations per hour of the second motor 151 driving the flow adjusting device 160 may be increased, and the period for opening and closing the flow adjusting device 160 may be extended. Therefore, the controller 140 may adjust the operation time $T_O$ such that the number of times the suction flow path 180 is opened and closed by the flow adjusting device 160 is constant even when the external power frequency is changed.

For example, when the external power frequency is 60 hertz (Hz), the opening and closing period of the flow adjusting device 160 may correspond to 3.3 seconds, and when the external power frequency is 50 Hz, the opening and closing period of the flow adjusting device 160 may correspond to 3.9 seconds. Therefore, the controller 140 may allow the suction device 150 and the flow adjusting device 160 to operate for an operation time (e.g., twenty-one seconds) at the external power frequency of 50 Hz that is longer than an operation time (e.g., eighteen seconds) at the external power frequency of 60 Hz.

With such a configuration, the docking station 100 ensures the number of times the suction flow path 180 is opened and closed regardless of the external power frequency, thereby ensuring the performance of removing foreign substances from the dust collecting container 15.

In this case, the controller 140 according to an embodiment may set the preset operation time $T_O$ such that the flow adjusting device 160 stops in a state in which the suction flow path 180 is open on the basis of the opening and closing period of the flow adjusting device 160 for the suction flow path 180.

The controller 140 may stop supplying voltages to the suction device 150 and the flow adjusting device 160 after the operation time $T_O$. However, even with no supply voltage to the suction device 150, the suction fan 153 may continue to rotate due to the inertia. Until the suction fan 153 is completely stopped after the interruption of the supply voltage to the suction device 150, the suction airflow on the suction flow path 180 may remain while decreasing. When the suction flow path 180 is closed by the flow adjusting device 160 in a situation where the air pressure changes due to a change in suction airflow, noise may be generated due to the instantaneous change in air pressure.

The controller 140 may set the operation time $T_O$ such that the flow adjusting device 160 is stopped in a state of the suction flow path 180 being open when the operation time $T_O$ has elapsed after the initiation of the operation, so that the suction flow path 180 is prevented from being closed in a situation in which the suction fan 153 continues to rotate after the supply voltage to the suction device 150 is interrupted, so that noise is prevented.

For example, when the flow adjusting device 160 initiates operating in a state of the suction flow path 180 closed, the controller 140 may determine the operation time $T_O$ to be an odd multiple of the opening and closing period of the flow adjusting device 160 for the suction flow path 180 in consideration of the opening and closing period.

The controller 140 according to the embodiment may control the flow adjusting device 160 to close the suction flow path 180 when a preset waiting time TW (e.g., 2.5 seconds) has elapsed after the operation time $T_O$.

That is, the controller 140 may allow the suction flow path 180 to be closed by controlling the flow adjusting device 160 after the operation time $T_O$, so that the suction device 150 is protected from foreign substances remaining on the suction flow path 180, and when initiating the operation, allow the suction device 150 to be turned on in a state of the suction flow path 180 open, so that noise is reduced.

As described above, the controller 140 controls the flow adjusting device 160 to open the suction flow path 180 during the waiting time TW after the operation time $T_O$, and then to close the suction flow path 180.

That is, the controller 140 may prevent the suction flow path 180 from being closed before the suction fan 153 is completely stopped after interruption of the supply voltage to the suction device 150, and may control the flow adjusting device 160 to close the suction flow path 180 when the suction fan 153 is completely stopped when the waiting time $T_w$ has elapsed after the operation time $T_O$.

In other words, the controller 140, in order to prevent noise from occurring due to a change in suction airflow by the residual rotational force after the stop of the operation of removing foreign substances from the dust collecting container 15, may stop the flow adjusting device 160 such that the suction flow path 180 remains open for a predetermined waiting time. In addition, the controller 140 may control the flow adjusting device 160 to close the suction flow path 180 after the waiting time, so that the suction device 150 is protected from foreign substances remaining in the suction flow path 180, and when initiating the operation of removing foreign substances, may allow the suction device 150 to operate in a situation where the suction flow path 180 is open, so that noise is prevented from occurring.

In this case, the controller 140 may adjust the time point of determining to the suction flow path 180 according to the external power frequency.

As described above, as the external power frequency becomes lower, the number of rotations of the second motor 161 decreases, and the opening and closing period of the flow adjusting device 160 for the suction flow path 180 may be extended.

Accordingly, as the external power frequency becomes lower, the time of closing the suction flow path 180 may become longer. For example, the closing time at 60 Hz may be 0.8 seconds, and the closing time at 50 Hz may be 1.05 seconds.

Accordingly, when controlling the flow adjusting device 160 to close the suction flow path 180 after the waiting time TW, the controller 140 may delay the time point at which the suction flow path 180 is determined as being closed in proportion to decrease of the external power frequency.

For example, the controller 140, referring to FIG. 8, when the external power frequency is 60 Hz, may determine the suction flow path 180 as being closed when a time $T_{a1}$ (e.g., 0.1 seconds) has elapsed since the position detection sensor 130 outputs the first value indicating closing of the suction flow path 180 after the waiting time TW. In addition, the controller 140, as shown in FIG. 8, when the external power frequency is 50 Hz, may determine the suction flow path 180 as being closed when a time $T_{a2}$ (e.g., 0.5 seconds) has elapsed since the position detection sensor 130 outputs the first value indicating closing of the suction flow path 180 after the waiting time TW.

That is, the controller 140 may delay the time point at which the suction flow path 180 is determined as being closed after the initiation of the output of the first value of the position detection sensor 130, since the time of closing the suction flow path 180 is extended as the external power frequency becomes lower.

With such a configuration, when newly initiating the operation of removing foreign substances from the dust collecting container 15, the suction device 150 may initiate the operation in a situation in which the suction flow path 180 is open regardless of the external power frequency.

That is, the controller 140 may be configured to, in response to a decrease in external power frequency, delay the time point at which the suction flow path 180 is determined as being closed after the first value starts to be output by the position detection sensor 130, so that the time taken for the flow adjusting device 160 to initiate opening the suction flow path 180 when a new operation is initiated may be constant regardless of the external power frequency, and thus variation in noise caused by different external power frequencies may be reduced. As shown in FIG. 8, a time $T_{b1}$ taken to open the suction flow path 180 at an external power frequency of 60 Hz may be the same as or may differ slightly from a time $T_{b2}$ taken to open the suction flow path 180 at an external power frequency of 50 Hz.

In other words, considering that the time of closing the suction flow path 180 at an external power frequency of 50 Hz is longer than that at an external power frequency of 60 Hz, the controller 140 may delay the closing determination time point at an external power frequency of 50 Hz to be later than that at an external power frequency of 60 Hz such that the flow adjusting device 160 is further operated for the delayed time. With such a configuration, the time remaining before the closing at an external power frequency of 60 Hz may be the same as or differ slightly from that at an external power frequency of 50 Hz, so that when a new operation is initiated, the variation in noise generation is negligible.

When supplying the voltage to the suction device 150 to initiate the operation, the controller 140 may gradually increase the magnitude of the voltage supplied during a soft start time, and from a time point when the soft start time has elapsed, supply a voltage having a magnitude corresponding to that of the target voltage.

That is, the voltage supplied to the suction device 150 may gradually increase during the soft start time and reach the target voltage, and then may be maintained at the target voltage until the operation time $T_O$ is reached.

This is to prevent the first motor 151 from greatly vibrating as being instantaneously supplied with a high voltage, and prevent the docking station 100 from being vibrated due to the great vibration of the first motor 151 while preventing noise from occurring due to the vibration of the docking station 100.

During the soft start time in which the voltage supplied to the suction device 150 increases, the flow rate of a suction airflow generated by the suction device 150 may increase, and when the suction flow path 180 is closed in a situation in which the flow rate of the suction airflow increases, noise may be generated due to a sudden change in air pressure in the suction flow path 180.

The controller 140 may control the flow adjusting device 160 to open the suction flow path 180 during the soft start time in which the voltage supplied to the suction device 150 increases to the target voltage to prevent noise from occurring.

For example, the controller 140, as shown in FIGS. 6 and 7, may determine the soft start time $T_{SS}$ to correspond to the time $T_{f1}$ of opening the flow path 180 by considering the opening and closing period $T_f$ of the flow control device 160 for the suction flow path 180.

That is, the soft start time $T_{SS}$ may be determined as a time from a time point when the opening of the suction flow path 180 is started to a time point when the closing of the suction flow path 180 is started in the continuous operation of the flow adjusting device 160.

In addition, the controller 140 may determine the soft start time $T_{SS}$ regardless of the opening and closing period $T_f$ of the flow path device 160 of the flow control device 160. For example, the controller 140 may set the soft start time $T_{SS}$ to be longer than the time $T_{f1}$ of opening the suction flow path 180 in the opening and closing period $T_f$ of the flow adjusting device 160 for the suction flow path 180 so that vibration of the docking station 100 may be minimized.

In this case, the controller 140, as shown in FIG. 9, may stop the flow adjusting device 160 for a time $T_{f3}$ corresponding to a difference between the soft start time $T_{SS}$ and the time $T_{f1}$ of opening the suction flow path 180 such that the suction flow path 180 is open during the soft start time $T_{SS}$.

In addition, the controller 140 according to an embodiment, when starting an operation for removing foreign substances in the dust collecting container 15 in a state in which the suction flow path 180 is open, may stop the operation of the flow adjusting device 160 for a predetermined time such that the suction flow path 180 is open during the soft start time $T_{SS}$, and may control the flow adjusting device 160 to close the suction flow path 180 after the soft start time $T_{SS}$.

With such configuration, the docking station 100 may prevent noise from occurring due to the suction flow path 180 being closed during the soft start time in which the voltage supplied to the suction device 150 increases.

The above description has been made in relation to an embodiment in which in order to supply an irregular suction airflow to the dust collecting container 15, the suction device 150 is controlled to continuously operate, and the flow adjusting device 160 is controlled to periodically open and close the suction flow path 180. Hereinafter, an embodiment in which a stop command is received from a user during the suction device 150 continuously operating and the flow adjusting device 160 periodically opening and closing the suction flow path 180 will be described in detail.

Figure 10:
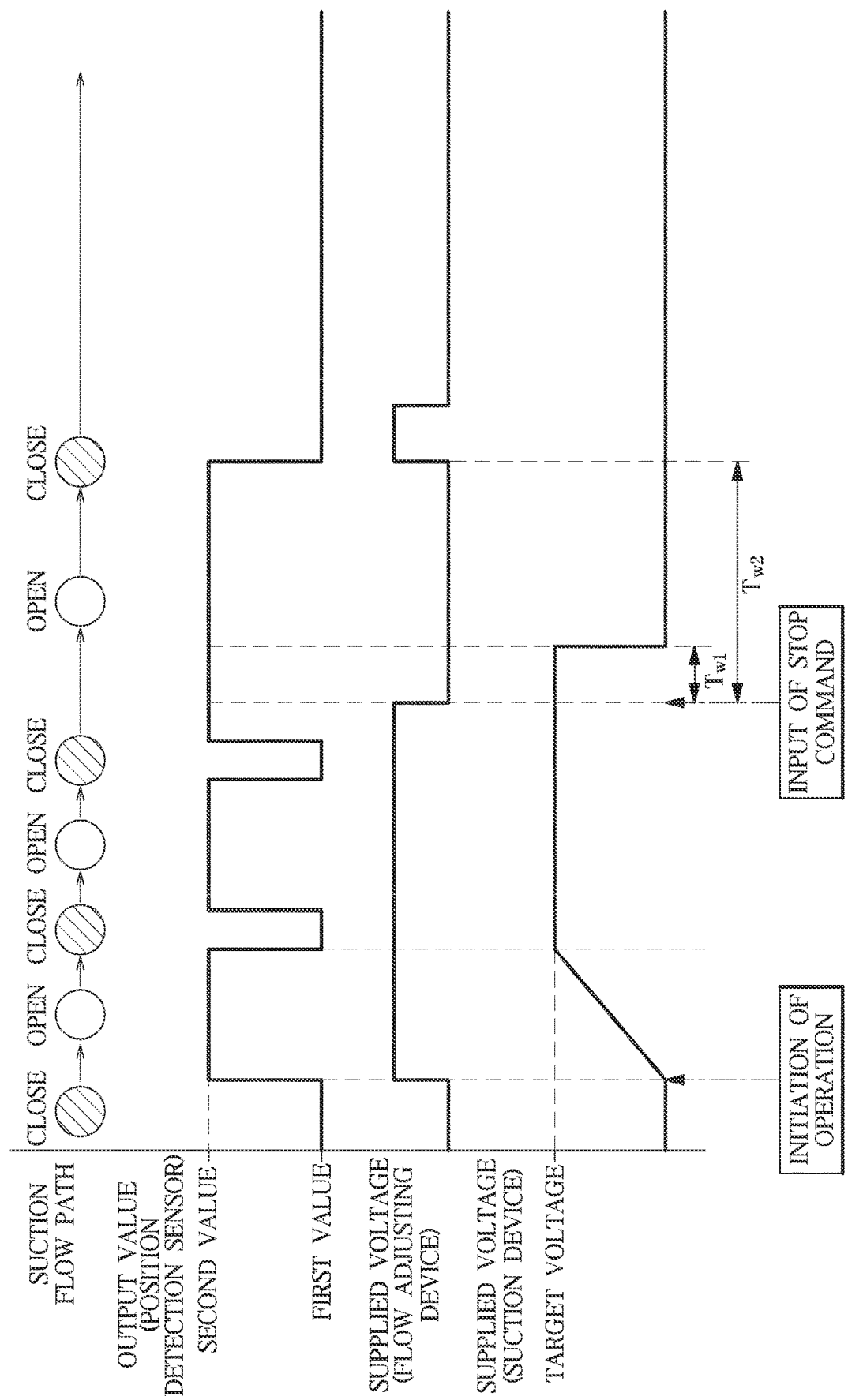
FIG. 10 is a view illustrating a case in which a docking station stops operation in response to input of a stop command with a suction flow path being open according to an embodiment of the disclosure.

FIG. 10 is a view illustrating a case in which the docking station 100 stops operation in response to input of a stop command with the suction flow path 180 being open according to an embodiment of the disclosure.

Figure 11:
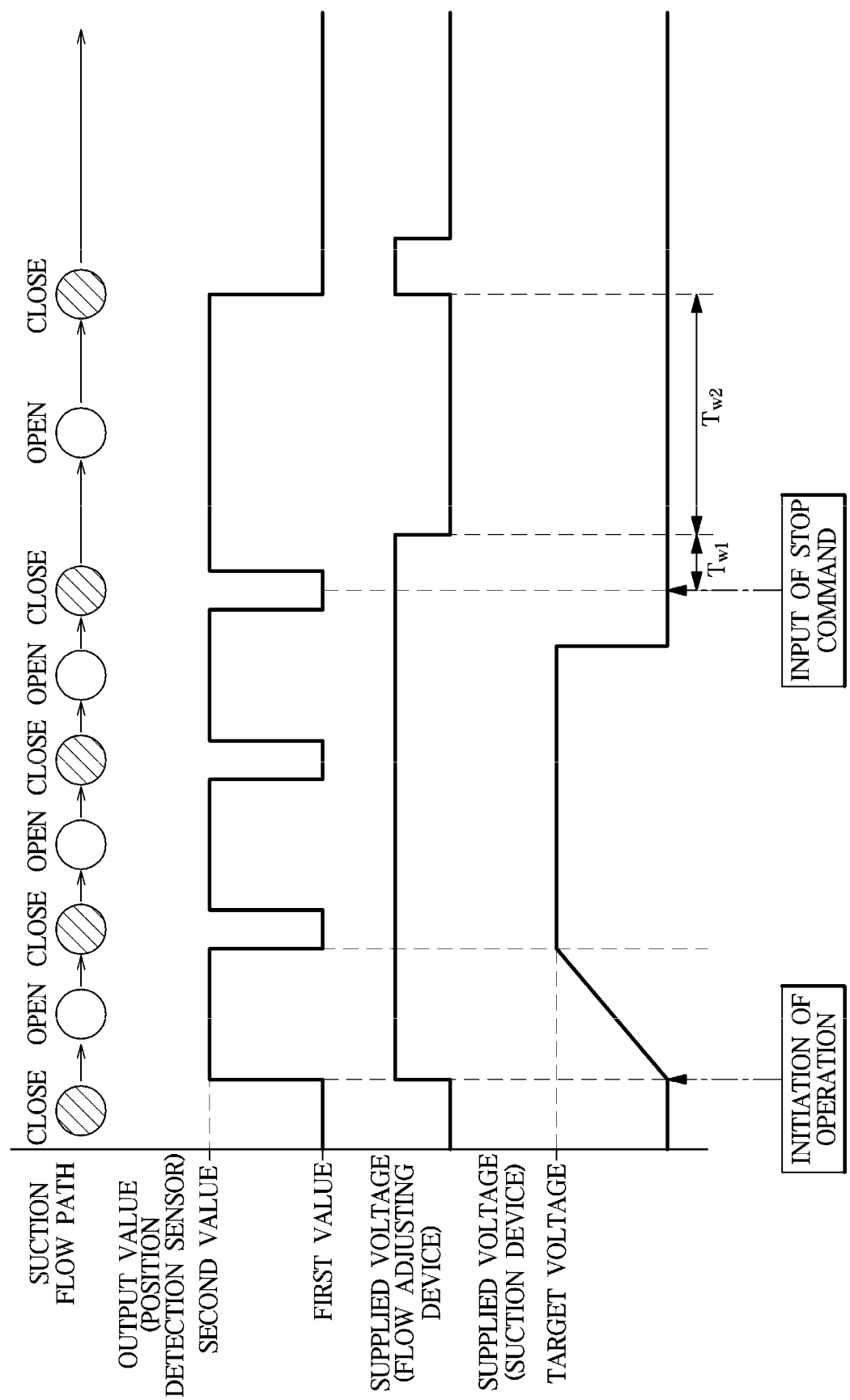
FIG. 11 is a view illustrating a case in which a docking station stops operation in response to an input of a stop command with a suction flow path being closed according to an embodiment of the disclosure.

FIG. 11 is a view illustrating a case in which the docking station 100 stops operation in response to input of a stop command with the suction flow path 180 being closed according to an embodiment of the disclosure.

Referring to FIGS. 10 and 11, the controller 140 according to the embodiment, in response to receiving an input of a stop command for the dust discharge operation through the inputter 120 while the suction device 150 and 160 are operating for discharging dust, may control 160 the open the suction flow path 180 and control the suction device 150 to stop operating after a first waiting time $T_{W1}$ (e.g., one second) since the stop command is input.

As described above, even when the supply voltage to the suction device 150 is interrupted, the suction fan 153 may continue to rotate due to the inertia. Until the suction fan 153 is completely stopped after the interruption of the supply voltage to the suction device 150, the suction airflow on the suction flow path 180 may remain while decreasing. In a situation where the air pressure changes due to a change in the suction airflow, when the suction flow path 180 is closed by the flow adjusting device 160, noise may occur due to the instantaneous change in air pressure.

Therefore, the controller 140, in response to receiving a stop command for the dust discharge operation after the initiation of the operation for dust discharge, may control the flow adjusting device 160 to stop operation in a state in which the suction flow path 180 is open by the flow adjusting device 160, so that the suction flow path 180 is prevented from being closed in a situation in which the suction fan 153 continues to rotate after the interruption of the supply voltage to the suction device 150, so that noise is prevented from occurring.

In detail, the controller 140 according to the embodiment, as shown in FIG. 10, when receiving the input for the stop command for the dust discharge operation in a state in which the suction flow path 180 is open, may stop the flow adjusting device 160 such that the suction flow path 180 remains open.

That is, the controller 140, in response to receiving an input of a stop command when the flow adjusting device 160 is in a position of opening the suction flow path 180 during the operation, may stop supplying the voltage to the flow adjusting device 160 to keep the suction flow path 180 open.

The controller 140 may stop supplying the voltage to the suction device 150 such that the suction device 150 stops operation when a first waiting time $T_{W1}$ has elapsed after the time point at which the stop command is input.

In this case, the controller 140, according to an embodiment, may control the flow adjusting device 160 to close the suction flow path 180 when a second waiting time $T_{W2}$ (e.g., 2.5 seconds) has elapsed after the time at which the stop command is input.

With such a configuration, the controller 140 may prevent the suction flow path 180 from being closed in a situation in which the suction fan 153 continues to rotate after the supply voltage to the suction device 150 is interrupted, so that noise is prevented from occurring.

Referring to FIG. 11, the controller 140 according to the embodiment, in response to receiving the input for the stop command for the dust discharge operation in a state in which the suction flow path 180 is closed, may operate the flow adjusting device 160 to open the suction flow path 180.

That is, the controller 150, in response to receiving the input of the stop command for the dust discharge when the flow adjusting device 160 is in a position of closing the suction flow path 180 during the operation, may maintain the voltage supply to the flow adjusting device 160 for a first waiting time $T_{W1}$ after the input of the stop command so that the suction flow path 180 is opened. In this case, the first waiting time $T_{W1}$ may correspond to a time required for the flow adjusting device 160 to move from the position where the suction flow path 180 is closed to the position where the suction flow path 180 is open.

The controller 140 may stop supplying the voltage to the suction device 150 such that the suction device 150 stops operation when the first waiting time $T_{W1}$ has elapsed after the input time of the stop command for the dust discharge operation, and with the voltage supply to the suction device 150 being stopped, also stop the voltage supply to the flow adjusting device 160, so that the suction device 150 and the flow adjusting device 160 may be stopped in a state in which the suction flow path 180 is opened by the flow adjusting device 160.

As described above, the controller 140 may control the suction device 150 and the flow adjusting device 160 to stop operation by counting the first waiting time $T_{W1}$, and according to an embodiment, may control the suction device 150 and the flow adjusting device 160 to stop operation by determining whether the flow adjusting device 160 opens the suction flow path 180 on the basis of the output value of the position detection sensor 130.

That is, the controller 140 may control the suction device 150 and the flow adjusting device 160 to stop operation in response to determining that the suction flow path 180 is open based on the output value of the position detection sensor 130 after the input of the stop command for the dust discharge operation of the docking station 100.

In this case, the controller 140, according to an embodiment, may control the flow adjusting device 160 to close the suction flow path 180 when the second waiting time $T_{W2}$ (e.g., 2.5 seconds) has elapsed after the interruption of the voltage supply to the suction device 150.

With such a configuration, the controller 140 may prevent the suction flow path 180 from being closed in a situation in which the suction fan 153 continues to rotate after the interruption of the supply voltage to the suction device 150, thereby preventing noise from occurring.

As described above, the controller 140 terminates a cycle by finally closing the suction flow path 180 after the input of the stop command for the dust discharge operation, so that the suction device 150 may be prevented from foreign substances remaining in the suction flow path 180, and when newly initiating an operation for removing foreign substances, allows the suction device 150 to operate in a state of the suction flow path 180 being open, so that noise may be prevented from occurring.

In the above, an embodiment in which the suction airflow supplied to the dust collecting container 15 is changed through the flow adjusting device 160 in a situation in which the suction device 150 is continuously operated has been described. Hereinafter, an embodiment in which the suction airflow supplied to the dust collecting container 15 is changed by changing on/off operation of the first motor 151 of the suction device 150 will be described in detail.

Figure 12:
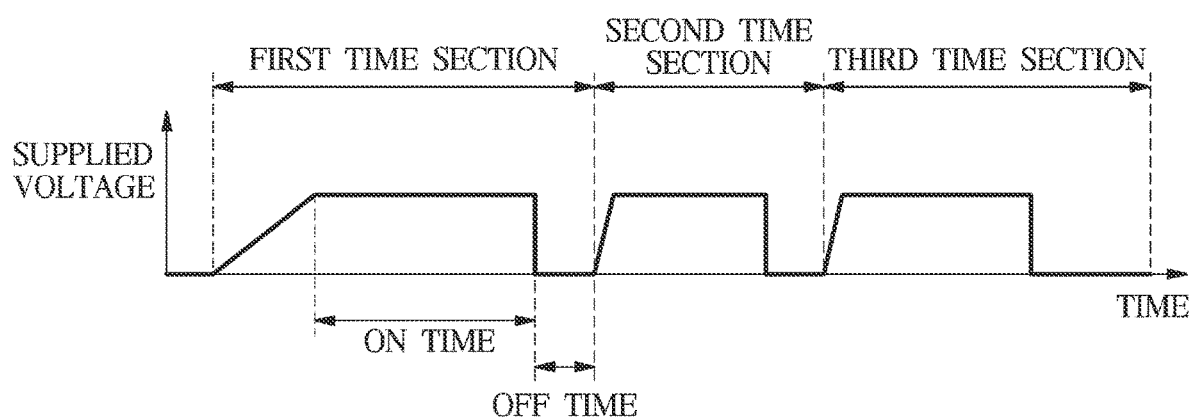
FIG. 12 is a graph showing time variant on-off control of a first motor according to an embodiment of the disclosure.
Figure 13:
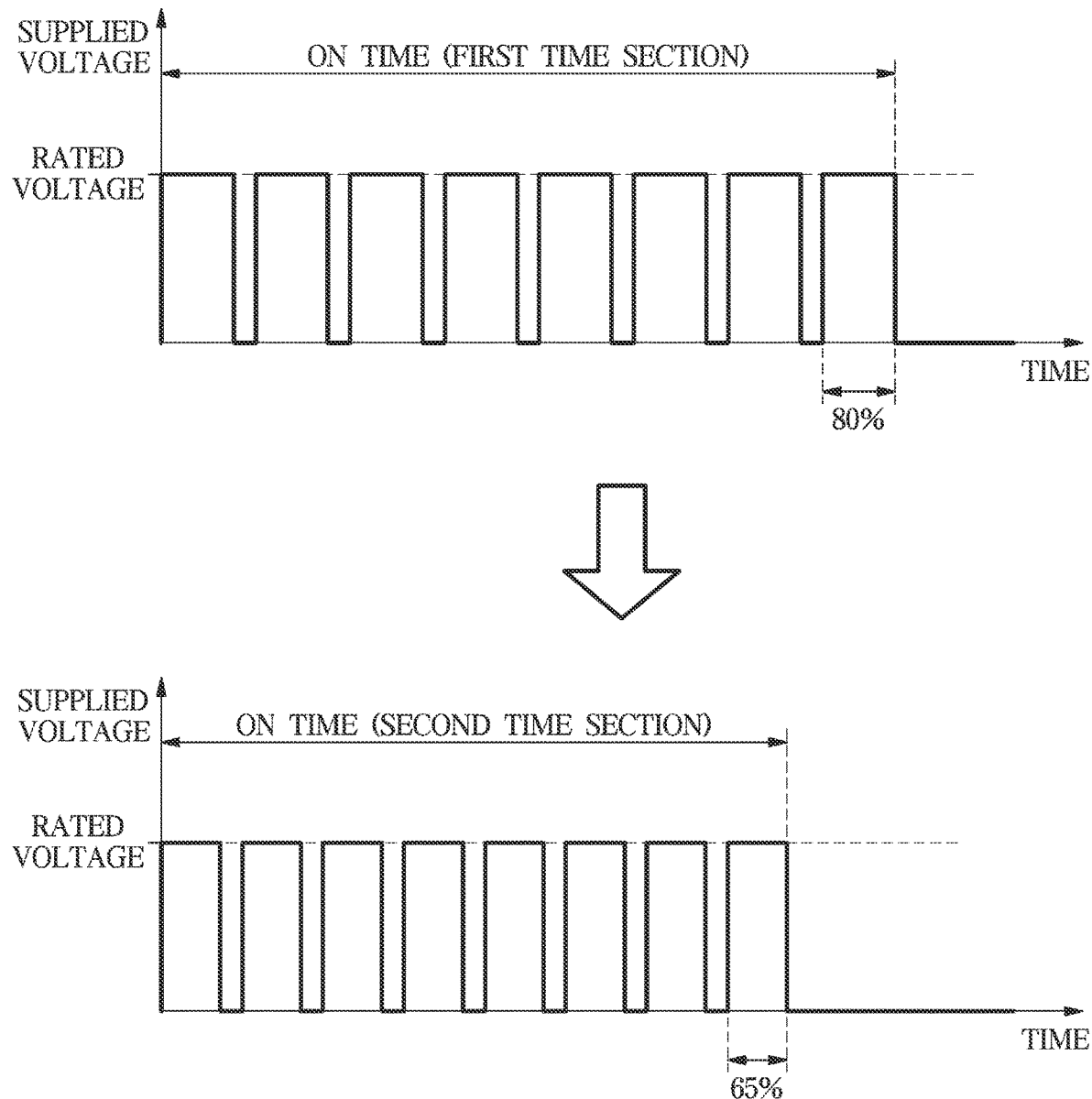
FIG. 13 is a view for describing a case in which a different rotation speed is provided whenever an on-operation of a first motor is repeated according to an embodiment of the disclosure.

FIG. 12 is a graph showing time variant on-off control of the first motor 151 according to the embodiment of the disclosure, and FIG. 13 is a view for describing a case in which a different rotation speed is provided whenever an on-operation of the first motor 151 is repeated according to an embodiment of the disclosure.

Referring to FIG. 12, the docking station 100 according to the embodiment may control the suction device 150 such that foreign substances in the dust collecting container 15 are discharged when the dust collecting container 15 of the vacuum cleaner 10 is connected to the docking station 100.

In detail, the docking station 100 may determine whether the dust collecting container 15 is connected to the docking station 100 based on the output value of the sensor 110, and when the dust collecting container 15 is connected to the docking station 100, initiate control of the first motor 151.

However, the controller 140 may further consider a user's control command inputted through the inputter 120 in addition to the output value of the sensor 110 such that the control of the first motor 151 is initiated only in the presence of the action command from the user.

In this case, when the first motor 151 is kept on and the same suction airflow is supplied to the dust collecting container 15, some of the foreign substances may be caught with internal components of the dust collecting container 15 and may not be discharged to the outside. For example, foreign substances, such as hair, may be caught with the internal structure of the dust collecting container 15, and despite the suction airflow, may remain inside the dust collecting container 15 without being separated to the outside of the dust collecting container 15. That is, the suction airflow delivered to the inside of the dust collecting container 15 may be formed only in the same direction. Accordingly, some foreign substances may have a resistance to the direction in which the suction airflow is formed, and thus may not be separated to the outside of the dust collecting container 15 by the suction airflow. Accordingly, foreign substances inside the dust collecting container 15 may not be effectively discharged.

The docking station 100 according to the embodiment, while a suction airflow is being supplied to the dust collecting container 15 by the suction fan 153 and air in the dust collecting container 15 is being suctioned, changes the suction airflow so that the flow rate of air inside the dust collecting container 15 is changed and the flow of air inside the dust collecting container 15 is diversified.

The controller 140, in order to provide an irregular suction airflow to the dust collecting container 15, may adjust at least one of the driving time or the rotating speed of the first motor 151 while repeating on/off the first motor 151.

That is, as illustrated in FIG. 12, the controller 140 may control the first motor 151 such that the first motor 151 is repeatedly turned on and off.

In detail, the controller 140 may control the first motor 151 such that the first motor 151 is turned on and then turned off in each of a plurality of time sections.

For example, referring to FIG. 12, the first motor 151 may repeat on/off according to progress of the time sections. In this case, one time section may include an on-time in which the first motor 151 is turned on by being supplied with the rated voltage, and an off-time in which the first motor 151 is turned off without being supplied with the rated voltage, and in order to vary the rotation speed at the beginning of each time section, the time (the soft start time) taken until the voltage supplied to the first motor 151 is boosted to the rated voltage may be set to be different for each time section.

In this case, the controller 140 adjusts at least one of the time for which the first motor 151 is turned on or the time for which the first motor 151 is turned off whenever the first motor 151 is alternately turned on and off, that is, whenever the time section is changed, so that the driving time of the first motor 151 is adjusted.

For example, an on-time in a first time section may be longer than an on-time in a second time section, and an off-time in the first time section may be shorter than an off-time in a third time section.

In addition, the controller 140 may adjust the pulse width of the supply voltage supplied to the first motor 151 whenever the first motor 151 is alternately turned on and off, to adjust the rotation speed of the first motor 151.

For example, referring to FIG. 13, the controller 140 may set the pulse width of the supply voltage supplied to the first motor 151 during the on-time of the first time section to 80%, and may set the pulse width of the supply voltage supplied to the first motor 151 during the on-time of the second time section followed by the first time section to 65%. Accordingly, the rotation speed of the first motor 151 may be reduced as progressing from the first time section to the second time section.

In this case, the suction fan 153 may provide the dust collecting container 15 with a suction airflow of a different suction power whenever the first motor 151 is alternately turned on and off, according to the change in driving time of the first motor 151 or rotating speed of the first motor 151, and as the internal pressure of the dust collecting container 15 changes due to the irregular suction airflow, foreign substances in the dust collecting container 15 may be smoothly discharged from the dust collecting container 15.

That is, as the flow rate of air inside the dust collecting container 15 changes, air spreads in all directions in the inner space of the dust collecting container 15, and thus the airflow inside the dust collecting container 15 may change in various directions.

As the direction of the airflow changes instantaneously, some foreign substance having had a resistance to a specific direction may lose the resistance due to air flowing in another direction and may escape outside of the dust collecting container 15 along with the airflow.

In this case, the foreign substances separated from the dust collecting container 15 and discharged may be moved together with air by the driving of the suction fan 153 and collected in the collector 190 provided in the suction flow path 180.

That is, the controller 140 repeats the supply and interruption of the suction airflow to the dust collecting container 15 through the on-off control of the first motor 151, and changes the supply time or suction power when supplying the suction airflow, thereby periodically changing the flow of air inside the dust collecting container 15. With such a configuration, foreign substances in the dust collecting container 15 may be discharged more efficiently.

The above description has been made on supplying the irregular suction airflow to the dust collecting container 15 by repeatedly turning on and off the first motor 151 of the suction device 150 such that the foreign substances in the dust collecting container 15 are efficiently discharged. Hereinafter, transmission of vibration to the dust collecting container 15 such that foreign substances in the dust collecting container 15 are efficiently discharged will be described in detail.

Figure 14:
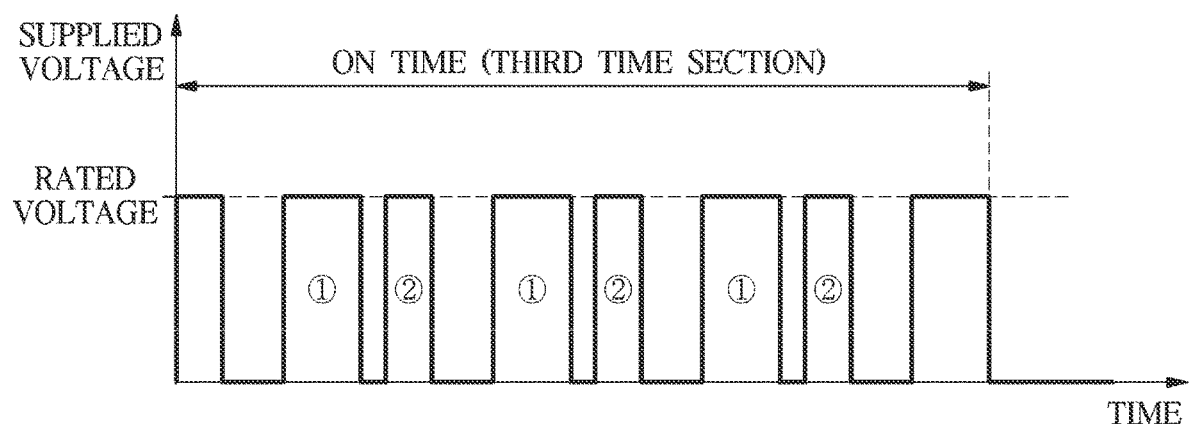
FIG. 14 is a view for describing a case in which a first motor vibrates to transmit vibration to a dust collecting container according to an embodiment of the disclosure.

FIG. 14 is a view for describing a case in which the first motor 151 vibrates to transmit vibration to the dust collecting container 15 according to an embodiment of the disclosure.

Referring to FIG. 14, the controller 140 according to the embodiment may set different pulse widths for pulses of the supply voltage within at least one of the time sections in which the first motor 150 is turned on and off so that the first motor 151 vibrates.

That is, the controller 140 sets the pulse widths of pulses of the supply voltage to be different from each other within an on-time in which the first motor 151 is turned on by being supplied with the voltage, and provides the first motor 150 with the set pulse widths.

For example, referring to FIG. 14, the controller 140 may adjust the pulse widths of the supply voltage such that a first pulse width ① and a second pulse width ② are alternately provided as the pulses of the supply voltage propagate in a third time section.

In this case, the first motor 151 may be subject to rapid change of the rotation speed based on the pulse width difference between the pulses of the supply voltage, so that the first motor 151 may vibrate.

The vibration of the first motor 151 may be transmitted to the main body of the docking station 100 and the dust collecting container 15 connected to the docking station 100. That is, the dust collecting container 15 may vibrate according to the vibration of the first motor 151, and foreign substances in the dust collecting container 15 may be discharged more efficiently according to the vibration. For example, even the foreign substances failing to escape from the dust collecting container 15 in spite of the suction airflow due to being caught in the internal components of the dust collecting container 15 may be discharged from the dust collecting container 15 according to the vibration of the dust collecting container 15 along with the suction airflow.

As described above, the docking station 100 according to the embodiment repeats supply and interruption of the suction airflow to the dust collecting container 15 through on-off control of the first motor 151, and adjusts pulse widths at a time of supplying a suction airflow within the same time section to cause vibration of the dust collecting container 15, so that foreign substances in the dust collecting container 15 may be discharged more efficiently.

The controller 140 according to the embodiment may repeat the on/off control of the first motor 151 until the dust collecting container 15 is separated from the docking station 100 or the first motor 151 is turned on by a preset number of times.

The controller 140 according to the embodiment may drive the first motor 151 for a preset time that is set for foreign substances remaining in the suction flow path 180 to be collected by the collector 190 when the dust collecting container 15 is connected to the docking station 100 and then is separated from the docking station 100.

In the above, transmission of vibration to the dust collecting container 15 so that foreign substances in the dust collecting container 15 are efficiently discharged has been described in detail. The following description will be made with regard to controlling the second motor 161 to open and close the suction flow path 180 through the flow adjusting device 160 in conjunction with the control of the first motor 151 for the irregular suction airflow.

Figure 15:
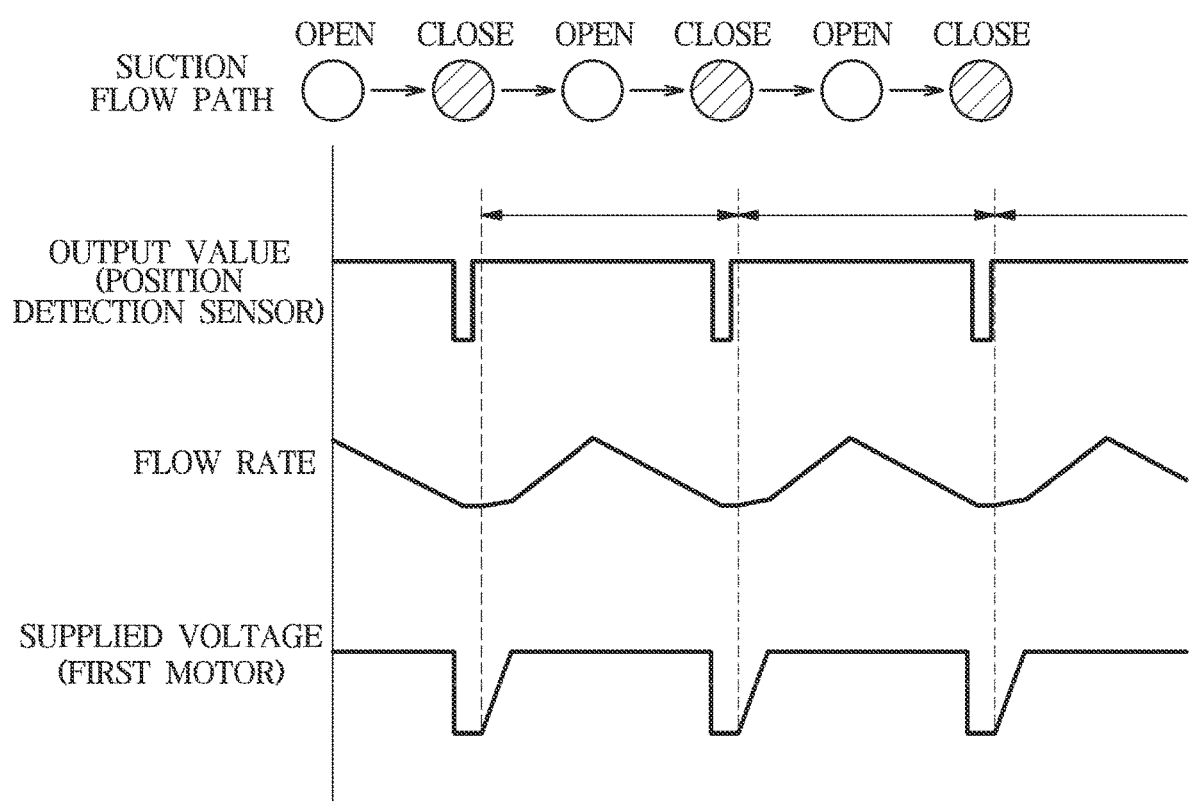
FIG. 15 is a view for describing control of a first motor in association with an operation of a flow path valve according to an embodiment of the disclosure.

FIG. 15 is a view for describing control of the first motor 151 according to an operation of the flow path valve 163 according to an embodiment of the disclosure.

Referring to FIG. 15, the controller 140 according to the embodiment may control the flow adjusting device 160 in addition to the control of the first motor 151 so as to periodically open and close the suction flow path 180 while the suction airflow by the suction fan 153 is being supplied according to the driving of the suction device 150.

That is, the controller 140 controls the second motor 161 so that the flow path valve 163 periodically opens and closes the suction flow path 180, to repeat supply and stop of the suction airflow to the dust collecting container 15, so that the flow of air inside the dust collecting container 15 is periodically changed. In other words, the flow path valve 163 may adjust the flow rate of air moved by the suction fan 153, and completely stop the suction airflow that may remain during an off time in which the voltage is not supplied to the first motor 151, thereby more effectively changing the flow of air inside the dust collecting container 15.

In this case, the controller 140 determines whether the suction flow path 180 is opened or closed by the flow path valve 163 based on the output value of the position detection sensor 130, and based on whether the suction flow path 180 is opened or closed, drives the first motor 151, so that noise and overload of the first motor 151 may be improved.

In detail, the controller 140 controls the first motor 151 to be turned on when the flow adjusting device 160 opens the suction flow path 180, and controls the first motor 151 to be turned off when the flow adjusting device 160 closes the suction flow path 180.

That is, the controller 140 controls the first motor 151 and the second motor 161 in connection with each other, thereby performing the supply and repetition of the suction airflow more efficiently, and preventing the suction fan 153 from causing noise due to being rotated when the suction flow path 180 is closed, and improving overload of the first motor 151.

In this case, the controller 140 may control the second motor 161 such that the flow path valve 163 opens and closes the suction flow path 180 at a preset cycle, and may control the second motor 161 to correspond to the driving time of the first motor 151 that is changed whenever the first motor 151 is alternately turned on and off.

That is, when the on-time in which the voltage is supplied to the first motor 151 or the off-time in which the voltage is not supplied to the first motor 151 is changed, the controller 140 may control the second motor 161 to operate the flow path valve 163 to correspond to the changed on-time and off-time.

The controller 140 according to the embodiment may control the flow path valve 163 to close the suction flow path 180 when the dust collecting container 15 is separated from the docking station 100. That is, the controller 140 may control the second motor 161 such that the flow path valve 163 closes the suction flow path 180.

In this case, the closing of the suction flow path 180 may be performed after the first motor 151 is driven for a predetermined time that is set in advance such that foreign substances remaining in the suction flow path 180 are collected by the collector 190.

Hereinafter, a suction mode in which the suction device 150 continuously operates with the suction flow path 180 being open will be described in detail.

Figure 16:
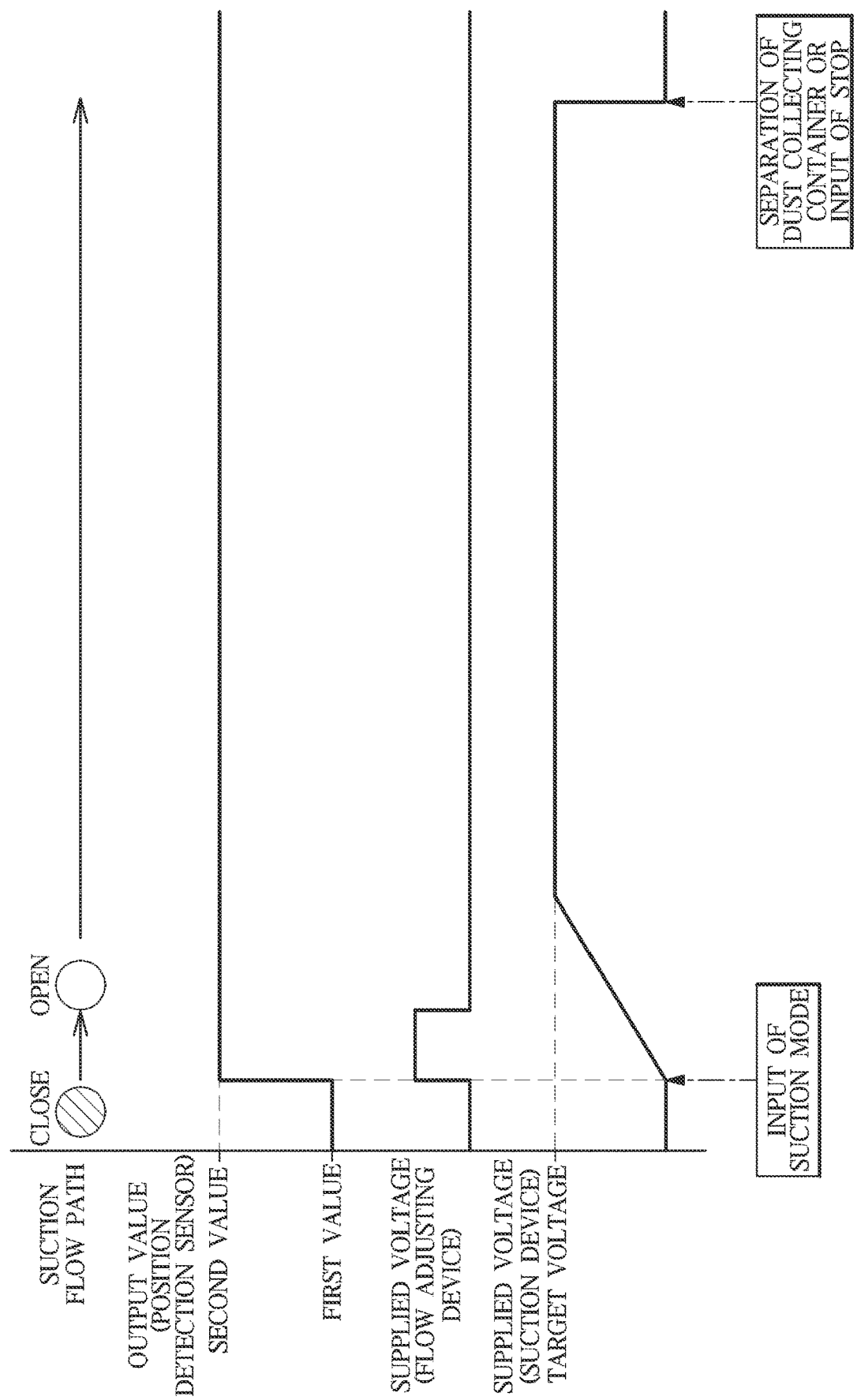
FIG. 16 is a view for describing a case in which a docking station performs a suction mode according to an embodiment of the disclosure.

FIG. 16 is a view for describing a case in which the docking station 100 performs a suction mode according to an embodiment of the disclosure.

Referring to FIG. 16, the controller 140 according to the embodiment, when receiving an action command for a suction mode through the inputter 120, may control the suction device 150 and the flow adjusting device 160 such that a suction airflow is continuously supplied in a state in which the suction flow path 180 is open.

In detail, the controller 140, in response to receiving an action command for a suction mode from a user in a state in which the dust collecting container 15 is connected to the docking station 100, may control the suction device 150 and the flow adjusting device 160 to perform the suction mode.

The controller 140 may determine whether the dust collecting container 15 is connected to the docking station 100 based on output of the sensor 110, and determine the input of the suction mode based on output of the inputter 120.

The suction mode is a mode for checking the suction force of the suction device 150, and may refer to a cycle in which a suction airflow is continuously supplied in a state in which the suction flow path 180 is open.

The controller 140, in response to receiving an input of the suction mode, may control the flow adjusting device 160 to open the suction flow path 180.

In detail, referring to FIG. 16, the controller 140 may supply the flow adjusting device 160 with a voltage to open the suction flow path 180 when the suction flow path 180 is closed at a time of receiving the input of the suction mode, and may stop supplying the voltage to the flow adjusting device 160 when the suction flow path 180 becomes open.

In addition, different from FIG. 16, the controller 140, when the suction flow path 180 is open at a time of receiving the input of the suction mode, may control the flow adjusting device 160 to stop such that the suction flow path 180 remains open.

The controller 140, in response to receiving the input of the suction mode, may control the suction device 150 to operate, and may continuously supplying the voltage to the first motor 151.

Referring to FIG. 16, the controller 140 may perform the suction mode until the dust collecting container 15 is separated from the docking station 100 or an input of a stop command is received. That is, the controller 140 may control the suction device 150 to stop when the dust collecting container 15 is separated from the docking station 100 or a stop command of the suction mode is received. However, the controller 140 according to an embodiment may control the suction device 150 to perform the suction mode only for a preset operation time and stop when the preset operation time has elapsed.

In addition, the controller 140 according to an embodiment may control the flow adjusting device 160 to close the suction flow path 180 when a predetermined waiting time has elapsed after the termination of the suction mode.

That is, the controller 140 may allow the suction flow path 180 to be closed by controlling the flow adjusting device 160 when a predetermined waiting time has elapsed after the supply of the voltage to the suction device 150 is stopped, so that the suction flow path 180 is prevented from being closed in a situation in which the suction fan 153 continues to rotate after the supply voltage to the suction device 150 is stopped, and thus noise is prevented from occurring.

The controller 140 according to an embodiment terminates a cycle by finally closing the suction flow path 180 after the termination of the suction mode, so that the suction device 150 may be protected from foreign substances remaining in the suction flow path 180, and when newly initiating an operation for removing foreign substances, allows the suction device 150 to operate in a state of the suction flow path 180 being open, so that noise may be prevented from occurring.

Hereinafter, a display mode in which the display part 170 continuously emits light will be described in detail.

Figure 17:
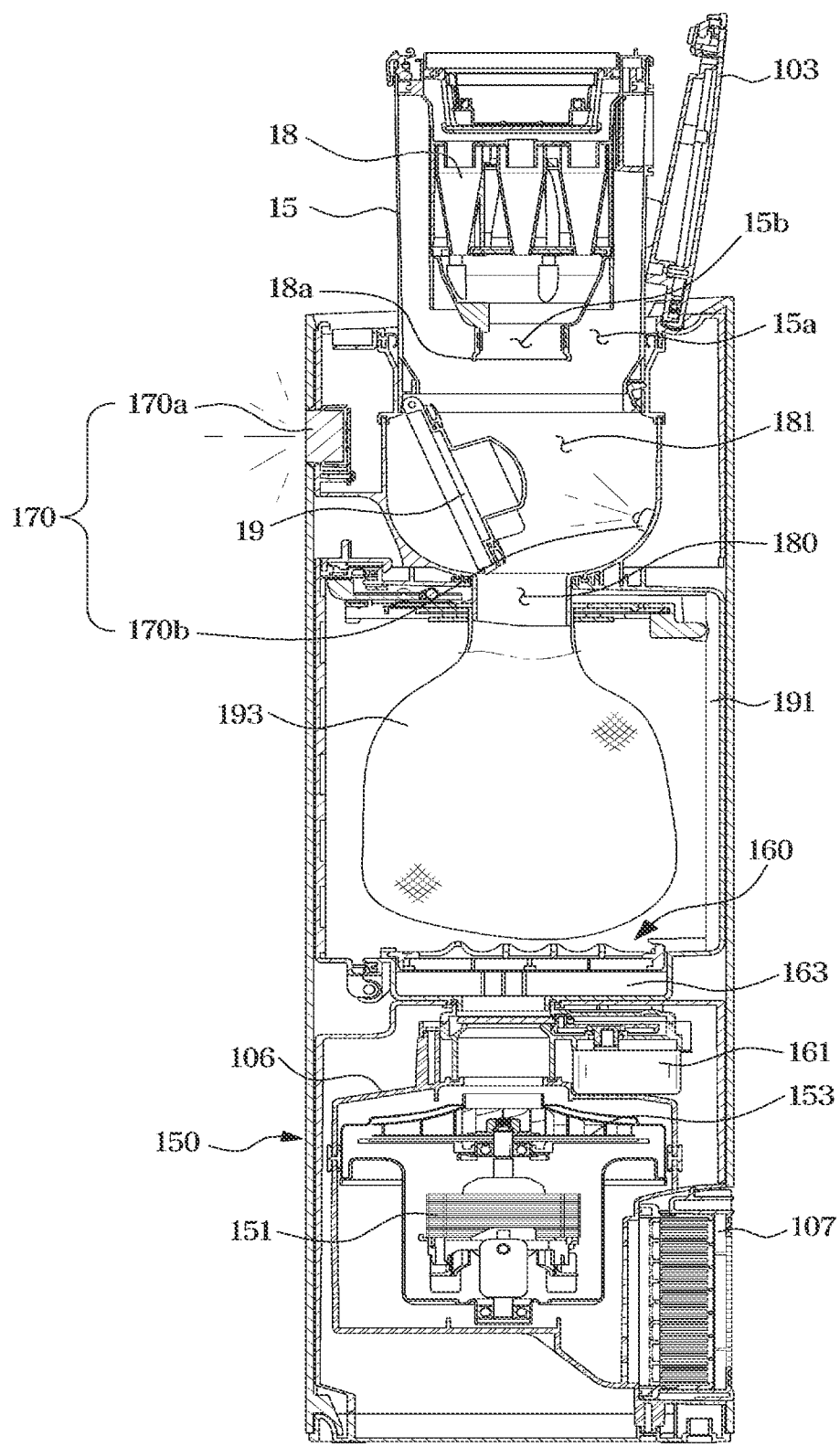
FIG. 17 is a view for describing a case in which a docking station performs a display mode according to an embodiment of the disclosure.

FIG. 17 is a view for describing a case in which the docking station 100 performs a display mode according to an embodiment of the disclosure.

Referring to FIG. 17, the controller 140 according to the embodiment, in response to receiving an input of a display mode through the inputter 120, may perform a display mode by controlling the display part 170 to emit light.

In detail, the controller 140, in response to receiving an input of a display mode through the inputter 120, may control at least one of a front display 170a provided on the front surface of the docking station 100 to emit light to the outside of the docking station 100 or an internal display 170b provided on the seating portion 181 to emit light from the inside of the seating portion 181 to the dust collecting container 15.

The controller 140, when performing the display mode, may control the display part 170 to continuously emit light regardless of the operation of the suction device 150, and may continue performing the display mode until the external power supply is stopped.

Hereinafter, an embodiment in which the display part 170 displays whether the collector 190 performs collection according to whether the collector 190 is in a full state will be described in detail.

Figure 18:
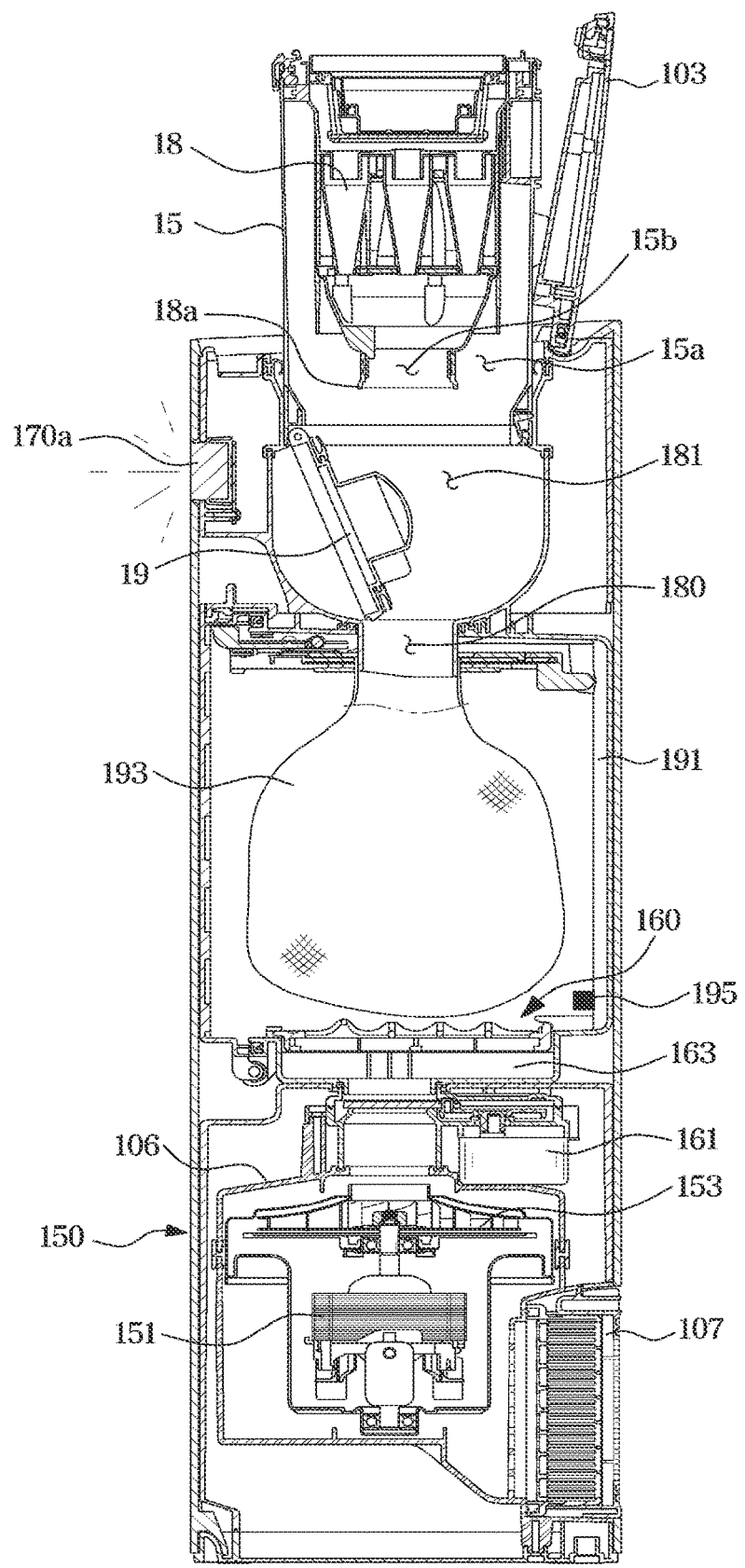
FIG. 18 is a view for describing a case in which a docking station determines fullness of a collector according to an embodiment of the disclosure.

FIG. 18 is a view for describing a case in which the docking station 100 determines fullness of the collector 190 according to an embodiment of the disclosure.

Referring to FIG. 18, the controller 140 according to the embodiment may determine whether the collector 190 is in a full state based on the output of the collector sensor 195, and may control the display part 170 to display fullness of the collector 190 when the collector 190 is in a full state.

For example, the controller 140 may control the front display 170a to output "red" light when the collector 190 is in a full state, and control the front display 170a to keep outputting "red" light until the dust bag 193 of the collector 190 is replaced.

The collector sensor 195, according to an embodiment, may be provided as a pressure sensor located in the suction flow path 180. For example, the collector sensor 195 may be provided in the collector housing 191 as illustrated in FIG. 18. However, the disclosure is not limited thereto, and the collector sensor 195 may be variously located as long as it can measure the pressure of the suction airflow. For example, the collector sensor 195 may be located on the suction device housing 106.

In this case, the collector sensor 195 may sense a pressure different from that in a normal operation when the collector 190 in a full state inhibits the suction airflow of the suction device 150.

With such a configuration, the controller 140 may determine fullness of the collector 190 when the collector sensor 195 outputs a pressure different from that in a normal operation, and may control the display part 170 to display fullness of the collector 190.

However, the collector sensor 195 is not limited to the above example, and may be provided as an optical sensor or a camera provided in the collector housing 191 and capable of detecting fullness of the collector 190.

As described above, the docking station 100 may notify the user of a situation in which foreign substances in the dust collector 15 are not normally discharged due to fullness of the collector 190, and may notify the user to replace the dust bag 193.

Hereinafter, an embodiment in which the dust collecting container 15 or the collector 190 is sterilized by irradiating the dust collecting container 15 or the collector 190 with ultraviolet rays will be described in detail.

Figure 19:
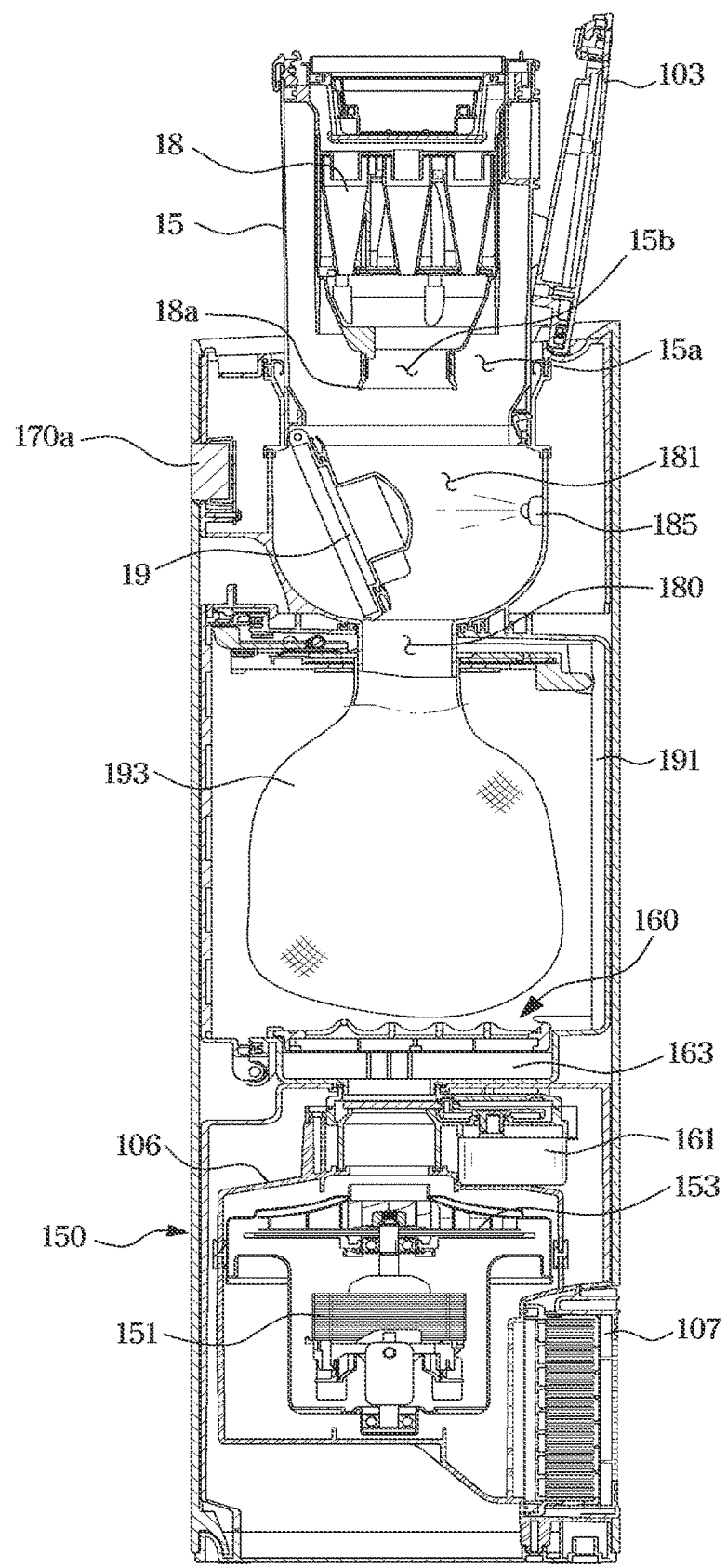
FIG. 19 is a view for describing a case in which a docking station radiates ultraviolet rays according to an embodiment of the disclosure.

FIG. 19 is a view for describing a case in which the docking station 100 radiates ultraviolet rays according to an embodiment of the disclosure.

Referring to FIG. 19, the controller 140 according to the embodiment may control the ultraviolet irradiator 185 to irradiate the dust collecting container 15 or the collector 190 with ultraviolet rays for sterilization.

The ultraviolet irradiator 185 according to the embodiment may irradiate the dust collecting container 15 or the collector 190 with ultraviolet rays.

To this end, the ultraviolet irradiator 185 may be provided as an ultraviolet lamp that is provided on the seating unit 181 and irradiates ultraviolet rays. In this case, ultraviolet rays from the ultraviolet irradiator 185 may be transmitted to the dust collecting container 15 connected to the docking station 100, and may be transmitted to the collector 190 through the suction flow path 180.

In addition, the ultraviolet irradiator 185 according to an embodiment may include a motor, and may irradiate the dust collecting container 15 or the collector 190 with ultraviolet rays by mechanically adjusting the irradiation angle based on the rotational force of the motor.

In addition, the ultraviolet irradiator 185 according to an embodiment may include a plurality of ultraviolet lamps, and may irradiate the dust collecting container 15 or the collector 190 with ultraviolet rays by electronically adjusting the irradiation angle through adjustment of the irradiation intensity of each of the plurality of ultraviolet lamps in an array.

In addition, the ultraviolet irradiator 185 according to an embodiment may include an ultraviolet lamp provided on the seating portion 181 to transmit ultraviolet rays to the dust collecting container 15 and an ultraviolet lamp provided on the collector housing 191 to transmit ultraviolet rays to the collector 190.

The controller 140 may control the ultraviolet irradiator 185 for ultraviolet irradiation when the suction device 150 operates to remove foreign substances from the dust collecting container 15 according to an embodiment.

In addition, the controller 140 according to an embodiment, when receiving a user input for ultraviolet irradiation through the inputter 120, may control the ultraviolet irradiator 185 to radiate ultraviolet rays for a preset time.

As such, the docking station 100 may sterilize the dust collecting container 15 and the collector 190 by irradiating the dust collecting container 15 and the collector 190 with ultraviolet rays.

Hereinafter, an embodiment of a method of controlling the cleaning device 1 according to an aspect will be described. The cleaning device 1 according to the above-described embodiment may be used for the method of controlling the cleaning device 1. Therefore, the above description made with reference to FIGS. 1 to 19 may apply to the method of controlling the cleaning device 1.

Figure 20:
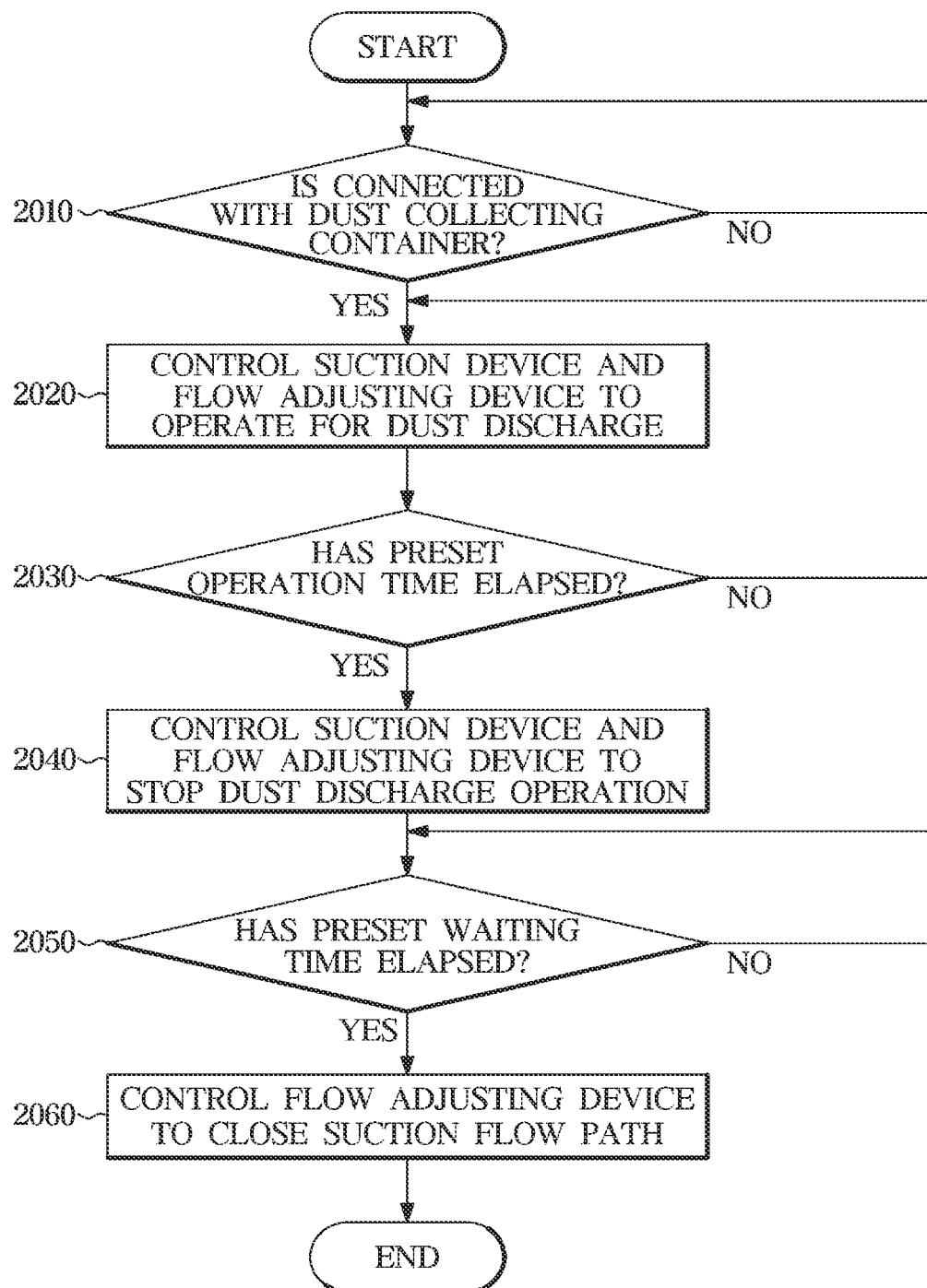
FIG. 20 is a flowchart of a method of controlling a cleaning device according to an embodiment, which shows automatic operation when connected with a dust collecting container according to an embodiment of the disclosure.

FIG. 20 is a flowchart of a method of controlling the cleaning device 1 according to an embodiment, which shows automatic operation when connected with the dust collecting container 15 according to an embodiment of the disclosure.

Referring to FIG. 20, the docking station 100 of the cleaning device 1 according to the embodiment, when connected with the dust collecting container (YES in operation 2010), may control the suction device 150 and the flow adjusting device 160 to operate for dust discharge in operation 2020.

That is, the controller 140, in response to determining that the dust collecting container 15 is docked to the seating portion 181 of the docking station 100 based on the output of the sensor 110, may control the suction device 150 and the flow adjusting device 160 to be supplied with a voltage to initiate an operation for removing foreign substances from the dust collecting container 15.

The controller 140, when the initiation of the operation is determined based on the connection of the dust collecting container 15, may control the suction device 150 to operate. That is, the controller 140 may supply a voltage to the suction device 150 to drive the suction fan 153 to form a suction airflow.

In addition, the controller 140 may control the flow adjusting device 160 to periodically open and close the suction flow path 180 while the suction device 150 is operating. That is, the controller 140 may supply a voltage to the flow adjusting device 160 to open and close the suction flow path 180 at a preset cycle.

With such a configuration, the suction device 150 may continuously generate the suction airflow through the suction fan 153, and the flow adjusting device 160 may periodically open and close the suction flow path 180 to thereby periodically change the flow rate of the suction airflow generated by the suction device 150.

As the direction of the airflow changes instantaneously, some foreign substances having a resistance to a specific direction may lose the resistance due to air flowing in the other direction and may escape outside of the dust collecting container 15 together with the airflow.

The docking station 100 of the cleaning device 1 according to the embodiment may control the suction device 150 and the flow adjusting device 160 to stop the dust discharge operation when a preset operation time To has elapsed (YES in operation 2030) after the initiation of the operation of the suction device 150 in operation 2040.

That is, the controller 140 may control the suction device 150 and the flow adjusting device 160 to operate during a preset operation time $T_O$ for discharging foreign substances from the dust collecting container 15, and when the preset operation time $T_O$ has elapsed after the initiation of the operation, may stop supplying the voltage to the suction device 150 and the flow adjusting device 160.

In this case, the flow adjusting device 160 may repeat the opening and closing of the suction flow path 180 by a preset number of times (e.g., five times) during the preset operation time $T_O$. That is, the preset operation time $T_O$ may be a time set to repeat the opening and closing of the suction flow path 180 by a preset number of times (e.g., five times) in consideration of the opening and closing period of the flow adjusting device 160.

In this case, the controller 140 according to the embodiment may set the preset operation time To such that the flow adjusting device 160 stops in a state in which the suction flow path 180 is open on the basis of the opening and closing period of the flow adjusting device 160 for the suction flow path 180.

The controller 140 may set the operation time $T_O$ such that the flow adjusting device 160 is stopped in a state of the suction flow path 180 being open when the operation time $T_O$ has elapsed after the initiation of the operation, so that the suction flow path 180 is prevented from being closed in a situation in which the suction fan 153 continues to rotate after the supply voltage to the suction device 150 is interrupted, so that noise is prevented.

The docking station 100 of the cleaning device 1 according to the embodiment may control the flow adjusting device 160 to close the suction flow path 180 when a preset waiting time TW (e.g., 2.5 seconds) has elapsed (YES in operation 2050) after the operation time $T_O$ in operation 2060.

That is, the controller 140 may allow the flow adjusting device 160 to stop such that the suction flow path 180 is open during a predetermined waiting time, to prevent noise from occurring due to a change in suction airflow caused by the suction force that remains after the stop of the operation for removing foreign substances from the dust collecting container 15. In addition, the controller 140 may control the flow adjusting device 160 to close the suction flow path 180 after the waiting time, so that the suction device 150 is protected from foreign substances remaining on the suction flow path 180, and when initiating the operation for removing foreign substances, allow the suction device 150 to operate in a state of the suction flow path 180 being open, so that noise is reduced.

Figure 21:
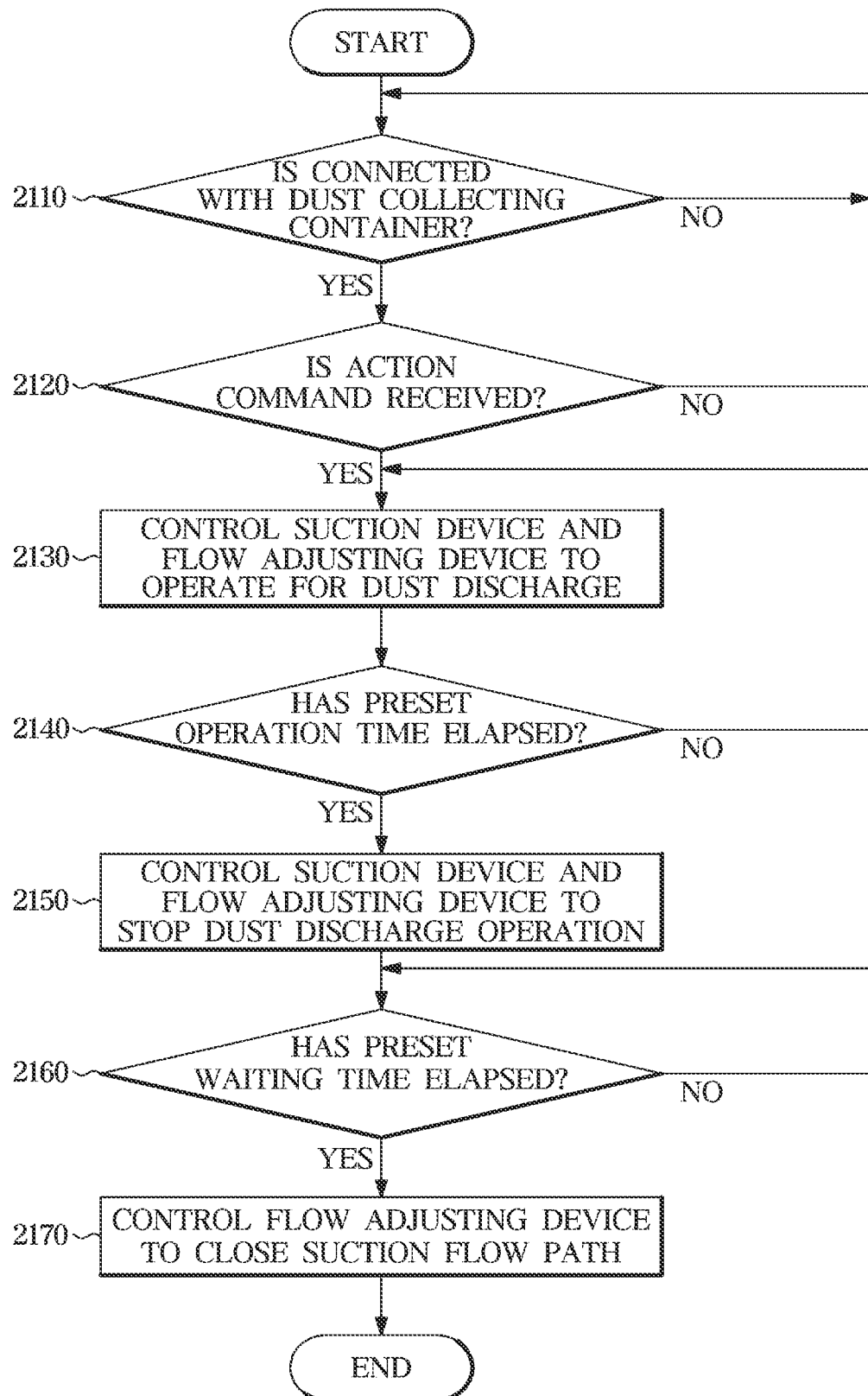
FIG. 21 is a flowchart of a method of controlling a cleaning device, which shows operation in response to input of an action command of the disclosure.

FIG. 21 is a flowchart showing a method of controlling the cleaning device 1, which shows operation in response to input of an action command according to an embodiment of the disclosure.

Referring to FIG. 21, the docking station 100 of the cleaning device 1 according to the embodiment, while connected with the dust collecting container 15 (YES in operation 2110), may configured to, in response to receiving an action command (YES in operation 2120), control the suction device 150 and the flow adjusting device 160 to operate for dust discharge in operation 2130.

Thereafter, the docking station 100 of the cleaning device 1 according to the embodiment may control the suction device 150 and the flow adjusting device 160 to stop the dust discharge operation when a preset operation time To has elapsed (YES in operation 2140) after the initiation of the operation of the suction device 150 in operation 2150.

In addition, the controller 140 according to the embodiment may control the flow adjusting device 160 to close the suction flow path 180 when a preset waiting time TW (e.g., 2.5 seconds) has elapsed (YES in operation 2160) after the operation time $T_O$ in operation 2170.

Since operations 2130 to 2170 correspond to operations 2030 to 2060 in FIG. 20, detailed descriptions will be omitted.

Figure 22:
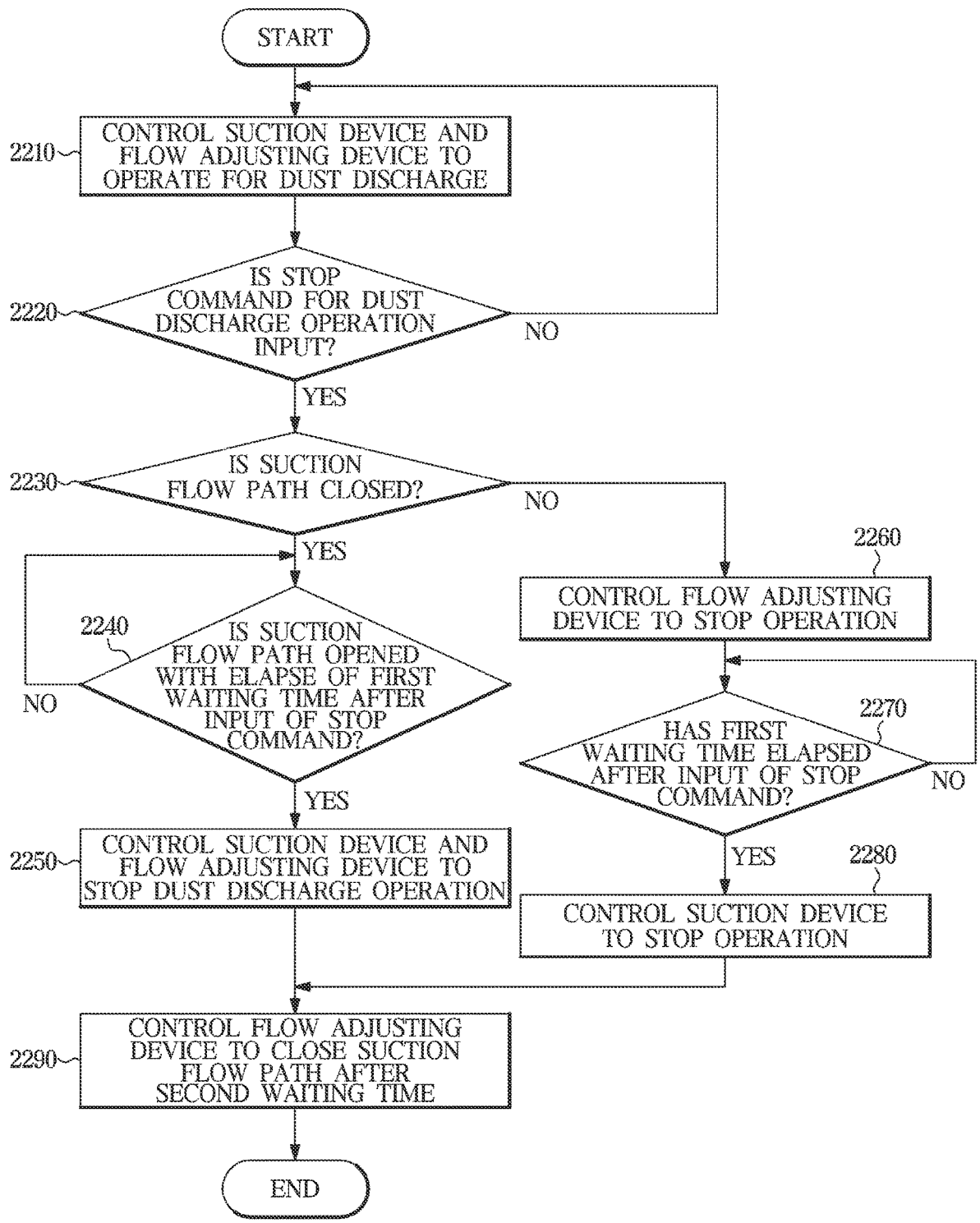
FIG. 22 is a flowchart of a method of controlling a cleaning device, which shows stopping operation in response to input of a stop command according to an embodiment of the disclosure.

FIG. 22 is a flowchart showing a method of controlling the cleaning device 1, which shows stopping operation in response to input of a stop command according to an embodiment of the disclosure.

Referring to FIG. 22, the docking station 100 of the cleaning device 1 according to the embodiment may control the suction device 150 and the flow adjusting device 160 to operate for dust discharge based on the connection of the dust collecting container 15 or the input of the action command of the user in operation 2210.

In this case, the controller 140 according to the embodiment, when a stop command for the dust discharge operation is input (YES in operation 2220) and the suction flow path 180 is closed (YES in operation 2230), may control the suction device 150 and the flow adjusting device 160 to stop the dust discharge operation when the suction flow path 180 becomes open (YES in operation 2240) as the first waiting time $T_{W1}$ has elapsed after the input of the stop command in operation 2250.

That is, the controller 140 according to the embodiment, in response to receiving the input of the stop command for the dust discharge operation in a state in which the suction flow path 180 is closed, may operate the flow adjusting device 160 to open the suction flow path 180.

In other words, the controller 150, in response to receiving the input of the stop command when the flow adjusting device 160 is in a position of closing the suction flow path 180 during the operation, may maintain the voltage supply to the flow adjusting device 160 for a first waiting time $T_{W1}$ from the time point at which the stop command is input so that the suction flow path 180 is opened. In this case, the first waiting time $T_{W1}$ may correspond to a time required for the flow adjusting device 160 to move from the position where the suction flow path 180 is closed to the position where the suction flow path 180 is opened.

As such, the controller 140 may stop supplying the voltage to the suction device 150 such that the suction device 150 stops operation when the first waiting time $T_{W1}$ has elapsed after the input of the stop command for the dust discharge operation, and with the voltage supply to the suction device 150 being stopped, also stops the voltage supply to the flow adjusting device 160, so that the suction device 150 and the flow adjusting device 160 are stopped in a state in which the flow adjusting device 160 opens the suction flow path 180.

As described above, the controller 140 may control the suction device 150 and the flow adjusting device 160 to stop operation by counting the first waiting time $T_{W1}$, and also may control the suction device 150 and the flow adjusting device 160 to stop operation by determining whether the flow adjusting device 160 opens the suction flow path 180 on the basis of the output value of the position detection sensor 130.

That is, the controller 140 may control the suction device 150 and the flow adjusting device 160 to stop operation in response to determining that the suction flow path 180 is open on the basis of the output value of the position detection sensor 130 after the input of the stop command for the dust discharge operation of the docking station 100.

With such a configuration, the controller 140 may prevent the suction flow path 180 from being closed in a situation in which the suction fan 153 continues to rotate after the supply voltage to the suction device 150 is interrupted, thereby preventing noise from occurring.

As described above, even with no supply voltage to the suction device 150, the suction fan 153 may continue to rotate due to the inertia. Until the suction fan 153 is completely stopped after the interruption of the supply voltage to the suction device 150, the suction airflow on the suction flow path 180 may remain while decreasing. When the suction flow path 180 is closed by the flow adjusting device 160 in a situation where the air pressure changes due to a change in suction airflow, noise may be generated due to the instantaneous change in air pressure.

Therefore, the controller 140, in response to receiving a stop command for the dust discharge operation after the initiation of the operation for dust discharge, may control the flow adjusting device 160 to stop operation in a state in which the flow adjusting device 160 opens the suction flow path 180, so that the suction flow path 180 is prevented from being closed in a situation in which the suction fan 153 continues to rotate after the interruption of the supply voltage to the suction device 150, so that the noise is prevented from occurring.

In addition, the controller 140 according to the embodiment, when the stop command for the dust discharge operation is input (YES in operation 2220) and the suction flow path 180 is open (NO in operation 2230), may control the flow adjusting device 160 to stop operation 2260. Thereafter, the docking station 100 of the cleaning device 1 may control the suction device 150 to stop operation when the first waiting time $T_{W1}$ has elapsed (YES in operation 2270) after the stop command is input in operation 2280.

That is, the controller 140 according to the embodiment, in response to receiving the input pf the stop command for the dust discharge operation in a state in which the suction flow path 180 is open, may allow the flow adjusting device 160 to stop such that the suction flow path 180 is kept open by the flow adjusting device 160.

In other words, the controller 140, in response to receiving the input of the stop command when the flow adjusting device 160 is in a position of opening the suction flow path 180 during the operation, may stop supplying the voltage to the flow adjusting device 160 to keep the suction flow path 180 open.

With such a configuration, the controller 140 may prevent the suction flow path 180 from being closed in a situation in which the suction fan 153 continues to rotate after the supply voltage to the suction device 150 is interrupted, so that noise is prevented from occurring.

The docking station 100 of the cleaning device 1 according to the embodiment may control the flow adjusting device 160 to close the suction flow path 180 when the second waiting time $T_{W2}$ (e.g., 2.5 seconds) has elapsed after the stop of the flow adjusting device 160 in operation 2290.

As described above, the controller 140 terminates a cycle by finally closing the suction flow path 180 after the input of the stop command for the dust discharge operation, so that the suction device 150 is protected from foreign substances remaining in the suction flow path 180, and when newly initiating an operation for removing foreign substances, allows the suction device 150 to operate in a state in which the suction flow path 180 is open, so that noise is prevented from occurring.

Figure 23:
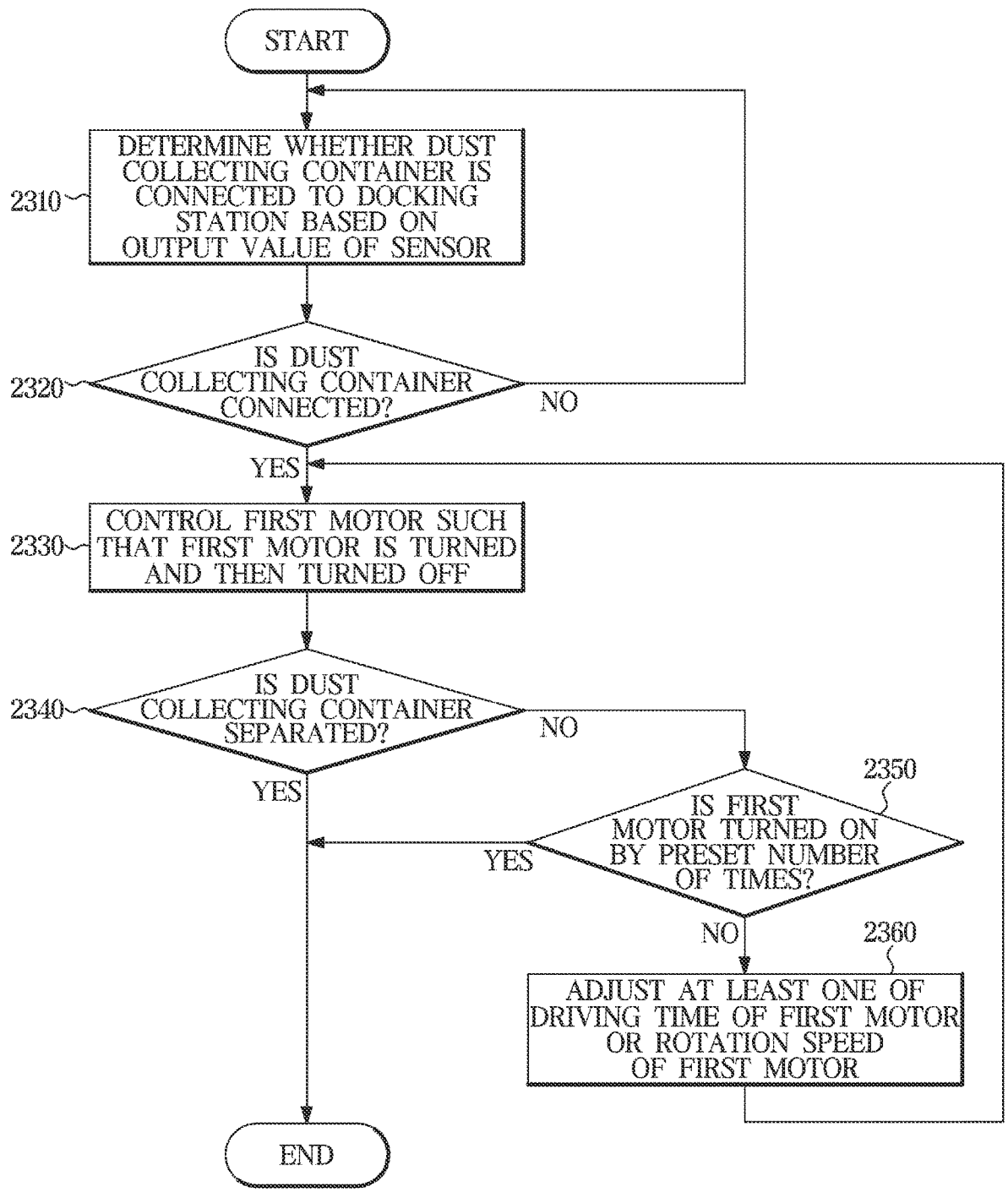
FIG. 23 is a flowchart of a method of controlling a cleaning device, which shows a case in which a flow rate of a suction airflow is adjusted by controlling a first motor according to an embodiment of the disclosure.

FIG. 23 is a flowchart showing the method of controlling the cleaning device 1, which shows a case in which a flow rate of a suction airflow is adjusted by controlling the first motor 151 according to an embodiment of the disclosure.

Referring to FIG. 23, the docking station 100 of the cleaning device 1 according to the embodiment may determine whether the dust collecting container 15 is connected to the docking station 100 based on the output value of the sensor 110 in operation 2310.

The docking station 100 of the cleaning device 1 according to the embodiment may control the first motor 151 to be turned on and then off when the dust collecting container 15 is connected to the docking station 100 (YES in 2320).

That is, the controller 140 of the docking station 100 may control the first motor 151 such that foreign substances in the dust collecting container 15 are discharged when the dust collecting container 15 of the vacuum cleaner 10 is connected to the docking station 100.

In detail, the controller 140 may determine whether the dust collecting container 15 is connected to the docking station 100 based on the output value of the sensor 110, and when the dust collecting container 15 is connected to the docking station 100, initiate performing control on the first motor 151.

However, the controller 140 may further consider a control command of a user input through the inputter 120 in addition to the output value of the sensor 110, and initiate performing control on the first motor 151 only in the presence of a command from the user.

The docking station 100 of the cleaning device 1 according to the embodiment, while a suction airflow is being supplied to the dust collecting container 15 by the suction fan 153 according to the driving of the first motor 151 and air in the dust collecting container 15 is suctioned, allows the suction airflow to be changed to thereby change the flow rate of air inside the dust collecting container 15 and diversify the flow of air inside the dust collecting container 15.

To this end, the docking station 100 of the cleaning device 1, when the dust collecting container 15 is not separated (No in operation 2340), and the number of times the first motor 151 is turned on does not reach a preset number of times (NO in operation 2350), may adjust at least one of the driving time of the first motor 151 or the rotation speed of the first motor 151 in operation 2360. Thereafter, the docking station 100 of the cleaning device 1 may control the first motor 151 such that the first motor 151 is turned and then turned off based on the adjusted driving time and/or the adjusted rotation speed in operation 2330.

As such, the controller 140, in order to provide an irregular suction airflow to the dust collecting container 15, may adjust at least one of the driving time or the rotating speed of the first motor 151 while repeating on/off the first motor 151.

That is, the controller 140 may control the first motor 151 such that the first motor 151 is alternately turned on and off.

In this case, the controller 140 may adjust the driving time of the first motor 151 by adjusting at least one of the time for which the first motor 151 is turned on or the time for which the first motor 151 is turned off whenever the first motor 151 is alternately turned on and off.

In addition, the controller 140 may adjust the rotating speed of the first motor 151 by adjusting a pulse width of a supply voltage supplied to the first motor 151 whenever the first motor 151 is alternately turned on and off.

In this case, the suction fan 153 may provide a suction airflow having a different suction power whenever the first motor 151 is alternately turned on and off according to a change in the driving time of the first motor 151 or the rotating speed of the first motor 151, and as the internal pressure of the dust collecting container 15 changes due to the irregular suction airflow, foreign substances in the dust collecting container 15 may be smoothly discharged from the dust collecting container 15.

That is, as the flow rate of air inside the dust collecting container 15 changes, air spreads in all directions in the space inside the dust collecting container 15, and accordingly, the airflow inside the dust collecting container 15 may change in various directions.

As the direction of the airflow changes instantaneously, some foreign substances having had a resistance to a specific direction may lose the resistance due to air flowing in another direction and may escape outside the dust collecting container 15 along with the airflow.

That is, the controller 140 repeats the supply and interruption of the suction airflow to the dust collecting container 15 through the on-off control of the first motor 151, and changes the supply time or suction power when supplying the suction airflow, thereby periodically changing the flow of air inside the dust collecting container 15. With such a configuration, foreign substances in the dust collecting container 15 may be discharged more efficiently.

According to the embodiment, the controller 140 may set different pulse widths for pulses of the supply voltage within at least one of the time sections in which the first motor 151 is alternately turned on and off, so that the first motor 151 vibrates.

In this case, the first motor 151 may be subject to rapid change of the rotation speed based on the pulse width difference between the pulses of the supply voltage, and accordingly, the first motor 151 may vibrate.

The vibration of the first motor 151 may be transmitted to the main body of the docking station 100 and the dust collecting container 15 connected to the docking station 100. That is, the dust collecting container 15 may vibrate according to the vibration of the first motor 151, and foreign substances in the dust collecting container 15 may be discharged more efficiently according to the vibration.

The docking station 100 of the cleaning device 1 according to the embodiment may repeat the on/off control of the first motor 151 until the dust collecting container 15 is separated from the docking station 100 (YES in operation 1040) or the first motor 151 is turned on by a preset number of times (YES in operation 1050). In this case, the preset number of times may be set in the design stage of the cleaning device 1, or may be set by the user through the inputter 120. However, the disclosure is not limited thereto, and the preset number of times may be set by the controller 140 based on information about the amount of foreign substances collected in the dust collecting container 15 obtained by a sensor or the like.

The controller 140 according to the embodiment may drive the first motor 151 for a preset time that is set for foreign substances remaining in the suction flow path 180 to be collected by the collector 190 when the dust collecting container 15 is connected to the docking station 100 and then is separated from the docking station 100.

Figure 24:
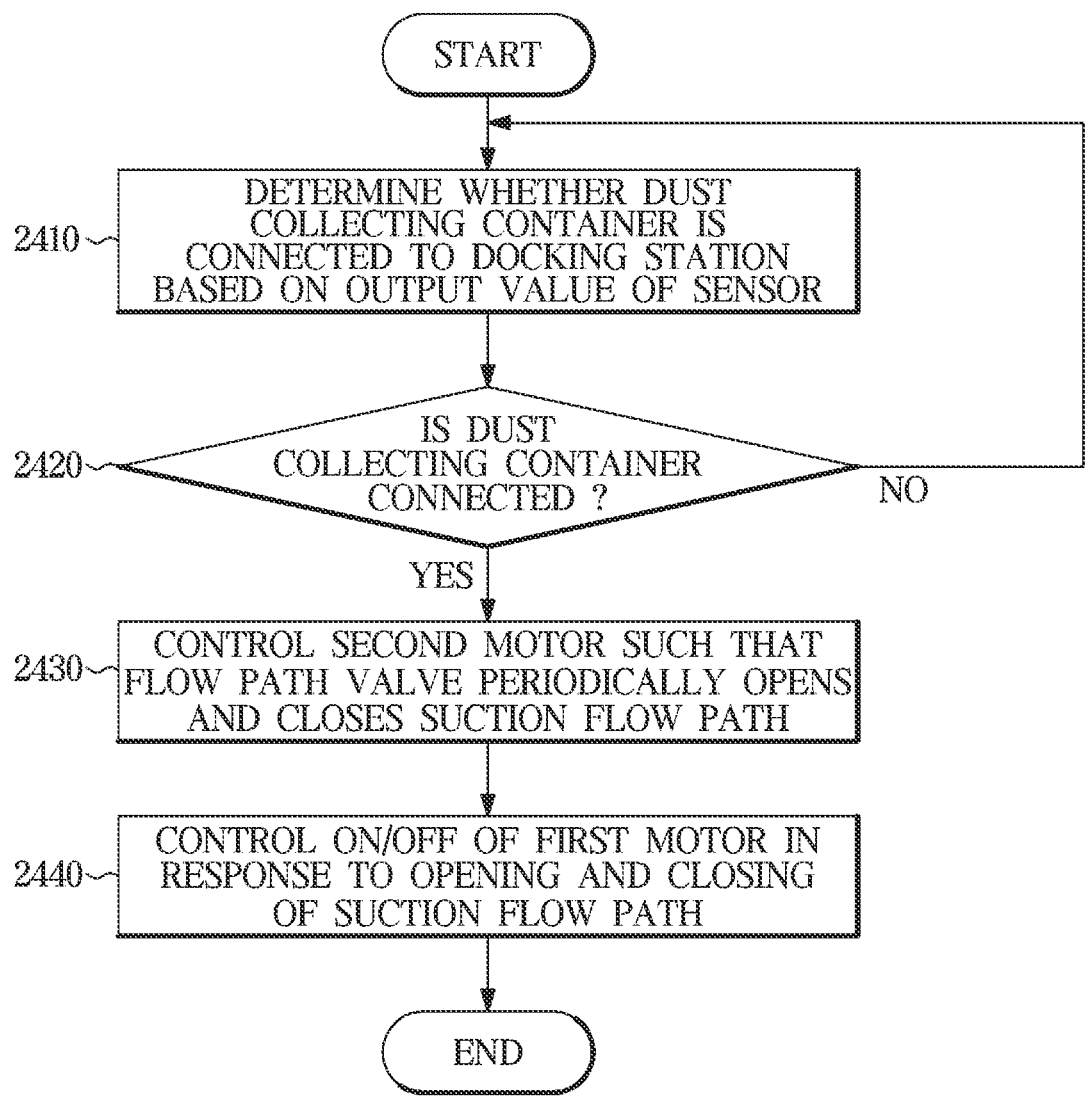
FIG. 24 is a flowchart of a method of controlling a cleaning device, which shows a case in which a first motor is controlled in association with an operation of a flow path valve according to an embodiment of the disclosure.

FIG. 24 is a flowchart showing a method of controlling the cleaning device 1, which shows a case in which the first motor 151 is controlled according to an operation of the flow path valve 163 according to an embodiment of the disclosure.

Referring to FIG. 24, the docking station 100 of the cleaning device 1 according to the embodiment may determine whether the dust collecting container 15 is connected to the docking station 100 based on the output value of the sensor 110 in operation 2410.

The docking station 100 of the cleaning device 1 according to the embodiment, when the dust collecting container 15 is connected to the docking station 100 (YES in operation 2420), may control the second motor 161 such that the flow path valve 163 periodically opens and closes the suction flow path 180 in operation 2430.

In detail, the controller 140 according to the embodiment may control the flow path valve 163 in addition to the control of the first motor 151 so as to periodically open and close the suction flow path 180 while the suction airflow by the suction fan 153 is being supplied according to the driving of the first motor 151.

That is, the controller 140 controls the second motor 161 so that the flow path valve 163 periodically opens and closes the suction flow path 180, to repeat supply and interruption of the suction airflow to the dust collecting container 15, so that the flow of air inside the dust collecting container 15 is periodically changed. In other words, the flow path valve 163 may adjust the flow rate of air moved by the suction fan 153, and completely stop the suction airflow that may remain during an off time in which the voltage is not supplied to the first motor 151, thereby more effectively changing the flow of air inside the dust collecting container 15.

The docking station 100 of the cleaning device 1 according to the embodiment may control on/off of the first motor 151 in response to opening and closing of the suction flow path 180 in operation 2440.

In other words, the controller 140 of the docking station 100 determines whether the suction flow path 180 is opened or closed by the flow path valve 163 based on the output value of the position detection sensor 130, and based on whether the suction flow path 180 is opened or closed, drives the first motor 151, so that noise and overload of the first motor 151 may be improved.

In detail, the controller 140 controls the first motor 151 to be turned on when the flow path valve 163 opens the suction flow path 180, and controls the first motor 151 to be turned off when the flow path valve 163 closes the suction flow path 180.

That is, the controller 140 controls the first motor 151 and the second motor 161 in conjunction with each other, thereby performing the supply and repetition of the suction airflow more efficiently, and preventing the suction fan 153 from causing noise due to being rotated when the suction flow path 180 is closed, and improving overload of the first motor 151.

In this case, the controller 140 may control the second motor 161 such that the flow path valve 163 opens and closes the suction flow path 180 at a preset cycle, and may control the second motor 161 to correspond to the driving time of the first motor 151 that is changed whenever the first motor 151 is alternately turned on and off.

That is, when the on-time in which the voltage is supplied to the first motor 151 or the off-time in which the voltage is not supplied to the first motor 151 is changed, the controller 140 may control the second motor 161 to operate the flow path valve 163 to correspond to the changed on-time and off-time.

Figure 25:
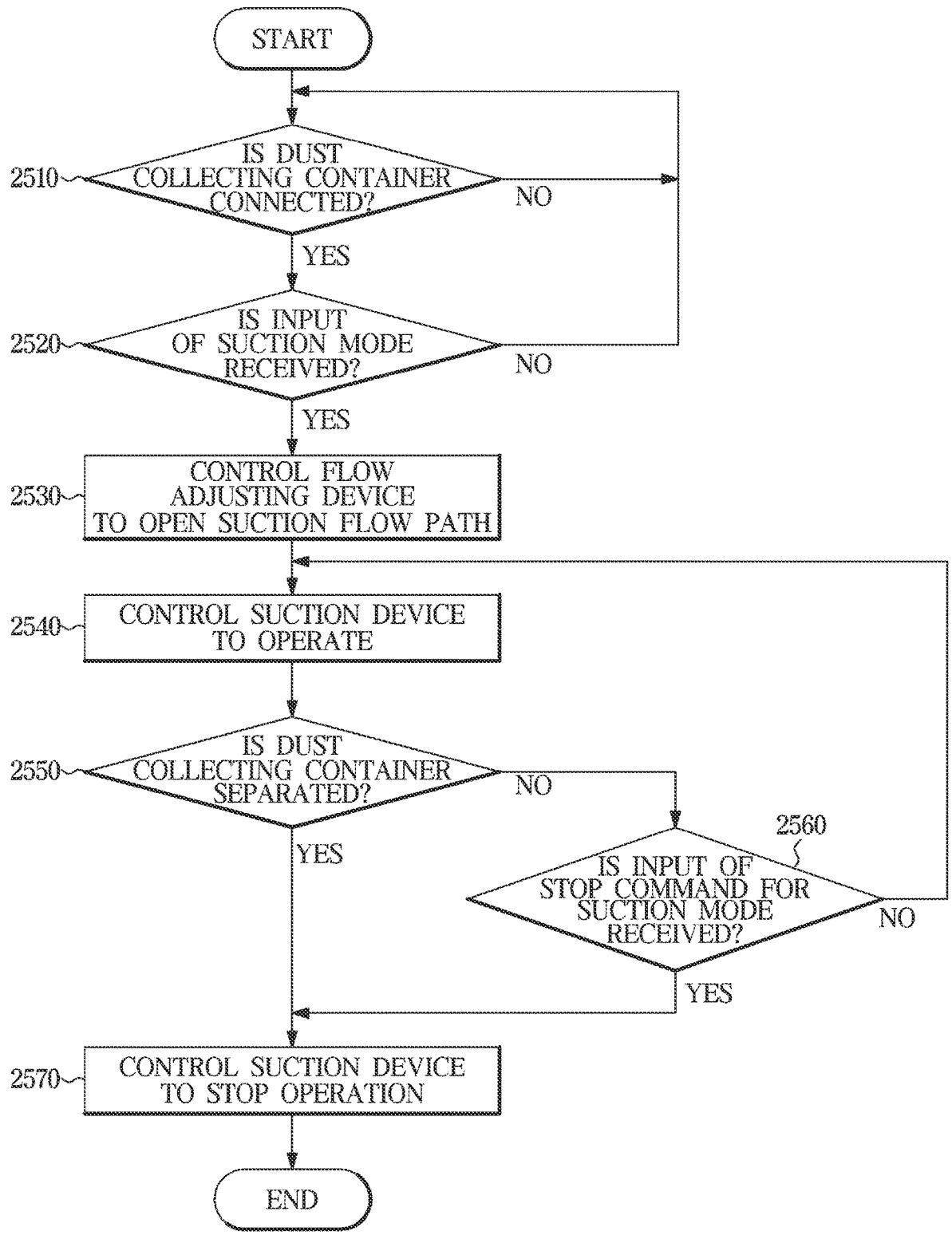
FIG. 25 is a flowchart of a method of controlling a cleaning device, which shows performing a suction mode according to an embodiment of the disclosure.

FIG. 25 is a flowchart showing the method of controlling the cleaning device 1, which shows performing a suction mode according to an embodiment of the disclosure.

Referring to FIG. 25, the docking station 100 of the cleaning device 1 according to the embodiment, when connected with the dust collecting container (YES in operation 2510) and receiving a command for a suction mode (YES in operation 2520) may control the flow adjusting device 160 to open the suction flow path 180 in operation 2530 and control the suction device 150 to operate in operation 2540.

That is, the controller 140 according to the embodiment, in response to receiving an action command for a suction mode through the inputter 120, may control the suction device 150 and the flow adjusting device 160 such that a suction airflow is continuously supplied in a state in which the suction flow path 180 is open.

In detail, the controller 140, in response to receiving an action command for a suction mode from a user in a state in which the dust collecting container 15 is connected to the docking station 100, may control the suction device 150 and the flow adjusting device 160 to perform the suction mode.

The controller 140 may determine whether the dust collecting container 15 is connected to the docking station 100 based on the output of the sensor 110, and determine the input of the suction mode based on the output of the inputter 120.

The suction mode is a mode for checking the suction force of the suction device 150, and may refer to a cycle in which a suction airflow is continuously supplied in a state in which the suction flow path 180 is open.

The controller 140, in response to receiving an input of the suction mode, may control the flow adjusting device 160 to open the suction flow path 180.

In detail, the controller 140 may supply a voltage to the flow adjusting device 160 to open the suction flow path 180 when the suction flow path 180 is closed at a time of receiving the input of the suction mode, and may stop supplying the voltage to the flow adjusting device 160 when the suction flow path 180 becomes open.

In addition, the controller 140, when the suction flow path 180 is open at a time of receiving the input of the suction mode, may control the flow adjusting device 160 to stop operation such that the suction flow path 180 remains open.

The controller 140, in response to receiving the input of the suction mode, may control the suction device 150 to operate and may keep supplying the voltage to the first motor 151 of the suction device 150.

The docking station 100 of the cleaning device 1 according to the embodiment, when the dust collecting container is separated (YES in operation 2550), or a stop command for the suction mode is received through the inputter 120 (YES in operation 2560), may control the suction device 150 to stop operation 2570.

As such, the controller 140 may perform the suction mode until the dust collecting container 15 is separated from the docking station 100 or an input of a stop command is received. That is, the controller 140 may control the suction device 150 to stop operation when the dust collecting container 15 is separated from the docking station 100 or a stop command of the suction mode is received. However, the controller 140 according to an embodiment may control the suction device 150 to perform the suction mode only for a preset operation time and stop when the preset operation time has elapsed.

In addition, the docking station 100 of the cleaning device 1 according to the embodiment may control the flow adjusting device 160 to close the suction flow path 180 when a predetermined waiting time has elapsed after the termination of the suction mode.

Figure 26:
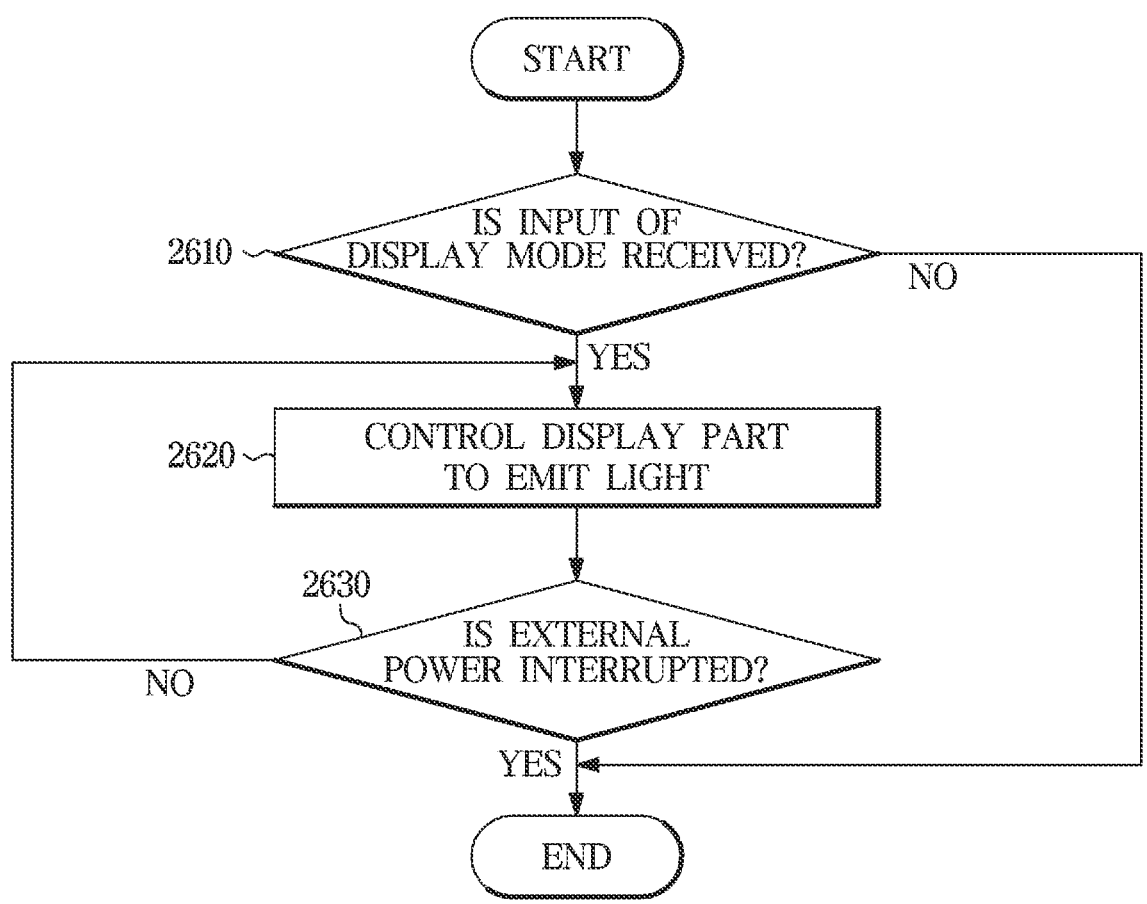
FIG. 26 is a flowchart of a method of controlling a cleaning device, which shows performing a display mode according to an embodiment of the disclosure.

FIG. 26 is a flowchart showing the method of controlling the cleaning device 1, which shows performing a display mode according to an embodiment of the disclosure.

Referring to FIG. 26, the docking station 100 of the cleaning apparatus 1 according to the embodiment, in response to receiving an input of a display mode in operation 2610, may control the display part 170 to emit light in operation 2620, and terminate the display mode when the external power is interrupted (YES in operation 2630).

In detail, the controller 140, in response to receiving an input of the display mode through the inputter 120, may control at least one of the front display 170a provided on the front surface of the docking station 100 to emit light to the outside of the docking station 100 or the internal display 170b provided on the seating portion 181 to emit light from the inside of the seating portion 181 to the dust collecting container 15.

The controller 140, when performing the display mode, may control the display part 170 to continuously emit light regardless of the operation of the suction device 150, and may continue performing the display mode until the external power supply is stopped.

Figure 27:
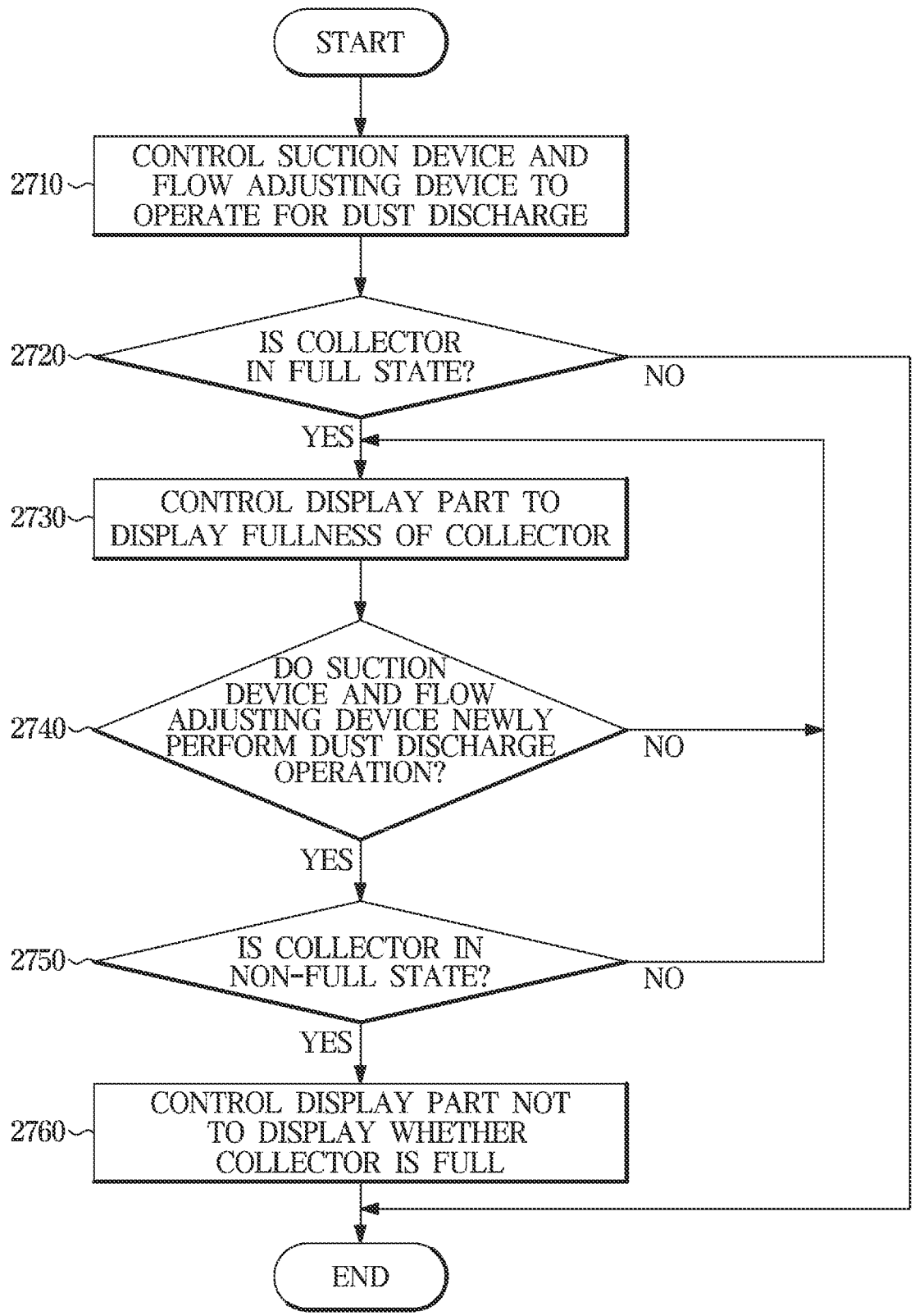
FIG. 27 is a flowchart of a method of controlling a cleaning device, which shows displaying fullness of a collector according to an embodiment of the disclosure.

FIG. 27 is a flowchart showing the method of controlling the cleaning device 1, which shows display fullness of the collector 190 according to an embodiment of the disclosure.

Referring to FIG. 27, the docking station 100 of the cleaning device 1 according to the embodiment may control the suction device 150 and the flow adjusting device 160 to operate for dust discharge on the basis of a connection of the dust collecting container 15 or an input of an action command from a user in operation 2710.

The docking station 100 of the cleaning device 1 according to the embodiment, when the collector 190 is in a full state (YES in operation 2720), may control the display part 170 to display fullness of the collector 190 in operation 2730.

In addition, the docking station 100 of the cleaning device 1 according to the embodiment, when the suction device 150 and the 60 newly perform the operation for dust discharge (YES in operation 2740), may re-determine whether the collector 190 is in a full state and when the collector is not in a full state (YES in operation 2750), control the display part 170 not to display whether the collector 190 is in a full state in operation 2760.

For example, the controller 140 may control the front display 170a to output "red" light when the collector 190 is in a full state, and control the front display 170a to keep outputting "red" light until the dust bag 193 of the collector 190 is replaced.

As such, the docking station 100 may notify the user of a situation in which foreign substances in the dust collector 15 are not normally discharged due to fullness of the collector 190, and may notify the user to replace the dust bag 193.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the cleaning device according to the embodiment allows foreign substance in a dust collecting container of a vacuum cleaner to be automatically and efficiently removed by providing an irregular suction airflow when the vacuum cleaner is docked to a docking station.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A cleaning device comprising:
a vacuum cleaner including a dust collecting container; and
a dust collecting station to which the dust collecting container is removably connected,
wherein the dust collecting station comprises:
a suction device disposed below the dust collecting container while the dust collecting container is connected to the dust collecting station, comprising a fan and a motor for rotating the fan, and configured to produce a suction airflow that flows vertically downward along a suction flow path from the dust collecting container to the suction device,
a dust bag disposed below the dust collecting container while the dust collecting container is connected to the dust collecting station and above the suction device, and configured to collect foreign substances that are moved by the suction airflow while the suction airflow flows through the dust bag,
a flow path control device comprising a plate provided in the suction flow path, and configured to selectively at least partially restrict the suction airflow while the suction airflow flows through the dust bag by moving the plate in the suction flow path to at least partially obstruct the suction flow path, and
at least one processor configured to:
control the suction device to operate based on a connection of the dust collecting container to the dust collecting station, and
control the flow path control device to move the plate in the suction flow path to change the suction airflow at the dust collecting container while the suction device operates.

2. The cleaning device of claim 1, wherein the at least one processor is further configured to:
control the suction device to stop operating based on a preset operation time elapsing after initiation of the operation of the suction device, and
control the flow path control device to move the plate in the suction flow path to completely obstruct the suction flow path after initiating the control of the suction device to stop operating.

3. The cleaning device of claim 2, wherein the at least one processor is further configured to control the flow path control device to move the plate in the suction flow path to completely obstruct the suction flow path based on a preset waiting time elapsing after initiating the control of the suction device to stop operating.

4. The cleaning device of claim 1,
wherein the dust collecting station further comprises a sensor configured to detect the connection of the dust collecting container to the dust collecting station, and
wherein the at least one processor is further configured to determine whether the dust collecting container is connected to the dust collecting station based on an output of the sensor.

5. The cleaning device of claim 1, wherein the at least one processor is further configured to:
control the suction device to stop operating based on a separation of the dust collecting container from the dust collecting station, and
control the flow path control device to move the plate in the suction flow path to completely obstruct the suction flow path after initiating the control of the suction device to stop operating.

6. The cleaning device of claim 1,
wherein the dust collecting station further comprises an inputter configured to receive an input from a user, and
wherein the at least one processor is further configured to:
control the suction device to stop operating based on an input of a stop command received through the inputter, and
control the flow path control device to move of the plate in the suction flow path to completely obstruct the suction flow path after initiating the control of the suction device to stop operating.

7. The cleaning device of claim 1,
wherein the at least one processor is further configured to adjust a rotation speed of the motor during operation of the suction device.

8. The cleaning device of claim 1,
wherein the dust collecting station further comprises a seating portion into which the dust collecting container is inserted, and
wherein the flow path control device is disposed between the seating portion and the dust bag.

9. The cleaning device of claim 1, wherein the suction flow path is unvented.

10. A cleaning device comprising:
a vacuum cleaner comprising a dust collecting container; and
a dust collecting station to which the dust collecting container is removably connected,
wherein the dust collecting station comprises:
an inputter configured to receive an input from a user,
a suction device disposed below the dust collecting container while the dust collecting container is connected to the dust collecting station, comprising a fan and a motor for rotating the fan, and configured to produce a suction airflow that flows vertically downward along a suction flow path from the dust collecting container to the suction device,
a dust bag disposed below the dust collecting container while the dust collecting container is connected to the dust collecting station and above the suction device, and configured to collect foreign substances that are moved by the suction airflow while the suction airflow flows through the dust bag,
a flow path control device comprising a plate provided in the suction flow path, and provided on the suction flow path and configured to selectively at least partially restrict the suction airflow while the suction airflow flows through the dust bag by moving the plate in the suction flow path to at least partially obstruct the suction flow path, and
at least one processor configured to:
control the suction device to operate based on a connection of the dust collecting container to the dust collecting station and an input of an operation command received through the inputter, and
control the flow path control device to move the plate in the suction flow path to change the suction airflow at the dust collecting container while the suction device operates.

11. The cleaning device of claim 10, wherein the at least one processor is further configured to:
   control the suction device to stop operating based on a preset operation time elapsing after initiation of the operation of the suction device, and
   control the flow path control device to move the plate in the suction flow path to completely obstruct the suction flow path after initiating the control of the suction device to stop operating.

12. The cleaning device of claim 11, wherein the at least one processor is further configured to control the flow path control device to move the plate in the suction flow path to completely obstruct the suction flow path based on a preset waiting time elapsing after initiating the control of the suction device to stop operating.

13. The cleaning device of claim 10,
   wherein the dust collecting station further comprises a sensor configured to detect the connection of the dust collecting container to the dust collecting station, and
   wherein the at least one processor is further configured to determine whether the dust collecting container is connected to the dust collecting station based on an output of the sensor.

14. The cleaning device of claim 10, wherein the at least one processor is further configured to:
   control the suction device to stop operating based on a separation of the dust collecting container from the dust collecting station, and
   control the flow path control device to move the plate in the suction flow path to completely obstruct the suction flow path after initiating the control of the suction device to stop operating.

15. The cleaning device of claim 10, wherein the at least one processor is further configured to:
   control the suction device to stop operating based on an input of a stop command received through the inputter, and
   control the flow path control device to move the plate in the suction flow path to completely obstruct the suction flow path after initiating the control of the suction device to stop operating.

16. The cleaning device of claim 10,
   wherein the at least one processor is further configured to adjust a rotation speed of the motor during operation of the suction device.

17. The cleaning device of claim 10,
   wherein the dust collecting station further comprises a seating portion into which the dust collecting container is inserted, and
   wherein the flow path control device is disposed between the seating portion and the dust bag.

18. The cleaning device of claim 10, wherein the suction flow path is unvented.

* * * * *